(12) United States Patent
Adjaoute

(10) Patent No.: US 7,089,592 B2
(45) Date of Patent: Aug. 8, 2006

(54) SYSTEMS AND METHODS FOR DYNAMIC DETECTION AND PREVENTION OF ELECTRONIC FRAUD

(75) Inventor: Akli Adjaoute, Joinville le Pont (FR)

(73) Assignee: Brighterion, Inc., San Francisco, CA (US)

( * ) Notice: Subject to any disclaimer, the term of this patent is extended or adjusted under 35 U.S.C. 154(b) by 789 days.

(21) Appl. No.: 09/810,313

(22) Filed: Mar. 15, 2001

(65) Prior Publication Data
US 2002/0133721 A1 Sep. 19, 2002

(51) Int. Cl.
G06F 11/00 (2006.01)
G06F 17/00 (2006.01)

(52) U.S. Cl. .......................................... 726/25; 726/1
(58) Field of Classification Search ................ 713/201; 706/15, 45, 20, 925, 1, 922, 2; 726/25, 26; 707/1, 3, 6; 717/100–167; 379/145, 189; 455/410
See application file for complete search history.

(56) References Cited

U.S. PATENT DOCUMENTS

| | | | |
|---|---|---|---|
| 5,692,107 A * | 11/1997 | Simoudis et al. | 706/12 |
| 5,819,226 A * | 10/1998 | Gopinathan et al. | 705/44 |
| 5,822,741 A | 10/1998 | Fischthal | |
| 6,009,199 A * | 12/1999 | Ho | 382/224 |
| 6,026,397 A * | 2/2000 | Sheppard | 707/5 |
| 6,029,154 A | 2/2000 | Pettitt | |
| 6,122,624 A | 9/2000 | Tetro et al. | |
| 6,347,374 B1 * | 2/2002 | Drake et al. | 713/200 |
| 6,453,246 B1 * | 9/2002 | Agrafiotis et al. | 702/27 |
| 6,535,728 B1 * | 3/2003 | Perfit et al. | 455/410 |
| 6,601,048 B1 * | 7/2003 | Gavan et al. | 706/10 |
| 6,647,379 B1 * | 11/2003 | Howard et al. | 706/25 |
| 6,711,615 B1 * | 3/2004 | Porras et al. | 709/224 |

FOREIGN PATENT DOCUMENTS

WO WO 98/32086 7/1998

OTHER PUBLICATIONS

Debar et al., "A Neural Network Component for an Intrusion Detection System", *Proceedings of the Computer Society Symposium on Research in Security and Privacy*, vol. SYMP.13, May 4, 1992, 240-250.

Denault et al., "Intrusion Detection: approach and performance issues of the SECURENET system", *Computers and Security*, 13(1994), 495-508.

Teng et al., "Adaptive real-time anomaly detection using inductively generated sequential patterns", *Proceedings of the Computer Society Symposium on Research in Security and Privacy*, vol. SYMP. 11, May 7, 1990, 278-284.

(Continued)

*Primary Examiner*—Hosuk Song
*Assistant Examiner*—Linh L D Son

(57) ABSTRACT

The present invention provides systems and methods for dynamic detection and prevention of electronic fraud and network intrusion using an integrated set of intelligent technologies. The intelligent technologies include neural networks, multi-agents, data mining, case-based reasoning, rule-based reasoning, fuzzy logic, constraint programming, and genetic algorithms. The systems and methods of the present invention involve a fraud detection and prevention model that successfully detects and prevents electronic fraud and network intrusion in real-time. The model is not sensitive to known or unknown different types of fraud or network intrusion attacks, and can be used to detect and prevent fraud and network intrusion across multiple networks and industries.

9 Claims, 26 Drawing Sheets

OTHER PUBLICATIONS

S. Abu-Hakima, M. Toloo, and T. White, "A Multi-Agent Systems Approach for Fraud Detection in Personal Communication Systems," Proceedings of the Fourteenth National Conference on Artificial Intelligence (AAAI-97), pp. 1-8, Jul. 1997.

A. Adjaoute, "Responding to the e-Commerce Promise with Non-Algorithmic Technology," *Handbook of E-Business*, Chapter F2, edited by J. Keyes, Jul. 2000.

P. E. Proctor, "Computer Misuse Detection System (CMDSTM) Concepts," *SAIC Science and Technology Trends*, pp. 137-145, Dec. 1996.

"AXENT Technologies' NetProwler™ and Intruder Alert™", *Hurwitz Report*, Hurwitz Group, Inc., Sep. 2000.

P. A. Porras and P. G. Neumann, "EMERALD: Event Monitoring Enabling Responses to Anomalous Live Disturbances," National Information Systems Security Conference, Oct. 1997.

A. Valdes and H. Javitz, "The SRI IDES Statistical Anomaly Detector," May 1991.

D. Anderson, T. Frivold, and A. Valdes, "Next-Generation Intrusion Detection Expert System (NIDES): A Summary," SRI Computer Science Laboratory Technical Report SRI-CSL-95-07, May 1995.

"SET Secure Electronic Transaction Specification," Book 1: Business Description, May 1997.

"PRISM FAQ", Nestor, Inc., www.nestor.com, date unknown.

"CyberSource Fraud Survey," CyberSource, Inc., web site, http://www.cybersource.com/solutions/risk_management/us_fraud_survey.xml, date unknown.

"eFalcon Helps E-Merchants Control Online Fraud," Financial Technology Insights Newsletter, HNC Software, Inc., Aug. 2000.

"2000 Internet Fraud Statistics," National Fraud Information Center web site, http://www.fraud.org, 2001.

"Guidelines to Healthcare Fraud," National Health Care Anti-Fraud Association web site, http://www.nhcaa.org/factsheet_guideline.html, Nov. 19, 1991.

"Health Insurance Fraud," http://www.helpstopcrime.org, date unknown.

"HIPPA Solutions: Waste, Fraud, and Abuse," ViPS, Inc., web site, http://www.vips.com/hipaa/combatwaste.html, 2001.

"HNC Insurance Solutions Introduces Spyder Software for Healthcare Fraud and Abuse Containment," HNC Software, Inc., press release, Dec. 4, 1998.

"What is Insurance Fraud?," http://www.helpstopcrime.org, date unknown.

"Insurance Fraud: The Crime You Pay For," http://www.insurancefraud.org/facts.html, date unknown.

"VeriComp™ Claimant," HNC Software, Inc., web site, 2001.

"Workers Compensation Fraud," http://www.helpstopcrime.org, date unknown.

"Homeowners Insurance Fraud," http://www.helpstopcrime.org, date unknown.

"The Impact of Insurance Fraud," chapter 5, Ohio Insurance Facts, Ohio Insurance Institute, 2000.

K. G. DeMarrais, "Old-fashioned check fraud still in vogue," Bergen Record Corp. web site, http://www.bergen.com/biz/savvy24200009242.htm, Sep. 24, 2000.

"Check Fraud Against Businesses Proliferates," Better Business Bureau web site, http://www.bbb.org/library/checkfraud.asp, 2000.

"CBA 1994 Fraud Survey," California Bankers Association web site, http://www.calbankers.com/legal/fraud.html, Jun. 1996.

"Consumers and Business Beware of Advance Fee Loan and Credit Card Fraud," Better Business Bureau web site, http://www.bbb.org/library/feeloan.asp, 2000.

"Check Fraud Statistics," National Check Fraud Center web site, http://www.ckfraud.org/statistics.hmtl, date unknown.

"Telemarketing Fraud Revisited," Better Business Bureau web site, http://www.bbb.org/library/tele.asp, 2000.

M. B. Guard, "Calling Card Fraud—Travelers Beware!," http://www.bankinfo.com/security/scallingcardhtml, Jun. 11, 1998.

"Wireless Fraud FAQ," World of Wireless Communications web site, http://www.wow-com/consumer/faq/articles.cfm?textOnly=1&ID=96, date unknown.

\* cited by examiner

| | | |
|---|---|---|
| Euclidean | $d(X_i, X_j) = \sqrt{\sum_{k=1}^{M}(X_{i,k}-X_{j,k})^2}$ | |
| Manhattan | $d(X_i, X_j) = \sum_{k=1}^{M} \lvert X_{i,k} - X_{j,k} \rvert$ | |
| Normalized Euclidean | $d(X_i, X_j) = \sqrt{\frac{1}{M}\sum_{k=1}^{M}\left(\frac{X_{i,k}-X_{j,k}}{max_k - min_k}\right)^2}$ | |
| Normalized Manhattan | $d(X_i, X_j) = \frac{1}{M}\sum_{k=1}^{M}\left\lvert\frac{X_{i,k}-X_{j,k}}{max_k - min_k}\right\rvert$ | |
| Weighted-Euclidean | $d(X_i, X_j) = \sqrt{\sum_{k=1}^{M} b_i * (X_{i,k}-X_{j,k})^2}$ | |

FIG. 15

| Global Similarity Measure | Expression |
|---|---|
| City-block | $\frac{1}{p}\sum_{i=4}^{p} sim_i(V_{1i}, V_{2i})$ |
| Weighted city-block | $\frac{1}{p}\sum_{i=4}^{p} w_i * sim_i(V_{1i}, V_{2i})$ |
| Euclidean | $\frac{1}{p}\sqrt{\sum_{i=4}^{p} sim_i(V_{1i}, V_{2i})^2}$ |
| Minkowski | $\frac{1}{p}\sqrt[r]{\sum_{i=1}^{p} sim_i(V_{1i}, V_{2i})^r}$ |
| Weighted Minkowski | $\sqrt[r]{\sum_{i=1}^{p} w_i * sim_i(V_{1i}, V_{2i})^r}$ |
| Weighted maximum | $\max_i w_i * sim_i(V_{1i}, V_{2i})$ |

| Local Similarity Measures | Field Type | Field Valuation |
|---|---|---|
| $\begin{cases} 0, & \text{if } V_1 \cap V_2 = \emptyset \\ 1, & \text{otherwise} \end{cases}$ | Nominal | Single, multiple |
| $\dfrac{Card(V_1 \cup V_2) - Card(V_1 \cap V_2)}{Card(V_1 \cup V_2)}$ | Nominal | Multiple |
| $\dfrac{Card(V_1 \cup V_2) - Card(V_1 \cap V_2)}{Min(V_1 \cup V_2)}$ | Nominal | Multiple |
| $\dfrac{Card(V_1 \cup V_2) - Card(V_1 \cap V_2)}{Max(V_1 \cup V_2)}$ | Nominal | Multiple |
| $\dfrac{Card(V_1 \cup V_2) - Card(V_1 \cap V_2)}{Card(O)}$ | Nominal | Multiple |
| $\dfrac{ec(\min(V_1^-, V_2^-), \max(V_1^+, V_2^+)) - Card(V_1 \cap V_2)}{Card(O)}$ | Ordinal, Numeric | Multiple |
| $\dfrac{|V_1 - V_2|}{ec(O)}$ | Numeric | Single |
| $\dfrac{|V_{1c} - V_{2c}|}{ec(O)}$ | Numeric | Multiple |
| $\dfrac{ec(\min(V_1^-, V_2^-), \max(V_1^+, V_2^+)) - ec(V_1 \cap V_2)}{ec(O)}$ | Numeric | Multiple |
| $\dfrac{ec(V_1 \cup V_2) - ec(V_1 \cap V_2)}{ec(V_1 \cup V_2)}$ | Numeric | Multiple |
| $\dfrac{ec(V_1 \cup V_2) - ec(V_1 \cap V_2)}{\min(ecV_1, ecV_2)}$ | Numeric | Multiple |
| $\dfrac{ec(V_1 \cup V_2) - ec(V_1 \cap V_2)}{\max(ecV_1, ecV_2)}$ | Numeric | Multiple |
| $\dfrac{2 * h(V_1 \cup V_2) - h(V_1) - h(V_2)}{2 * h_{max}}$ | Taxonomic | Multiple |
| $\dfrac{h(\text{node that unit } V_1 \text{ \& } V_2)}{\text{total height of } h}$ | Taxonomic | Single |

*FIG. 26*

SYSTEMS AND METHODS FOR DYNAMIC DETECTION AND PREVENTION OF ELECTRONIC FRAUD

FIELD OF THE INVENTION

The present invention relates generally to the detection and prevention of electronic fraud and network intrusion. More specifically, the present invention provides systems and methods for dynamic detection and prevention of electronic fraud and network intrusion using an integrated set of intelligent technologies.

BACKGROUND OF THE INVENTION

The explosion of telecommunications and computer networks has revolutionized the ways in which information is disseminated and shared. At any given time, massive amounts of information are exchanged electronically by millions of individuals worldwide using these networks not only for communicating but also for engaging in a wide variety of business transactions, including shopping, auctioning, financial trading, among others. While these networks provide unparalleled benefits to users, they also facilitate unlawful activity by providing a vast, inexpensive, and potentially anonymous way for accessing and distributing fraudulent information, as well as for breaching the network security through network intrusion.

Each of the millions of individuals exchanging information on these networks is a potential victim of network intrusion and electronic fraud. Network intrusion occurs whenever there is a breach of network security for the purposes of illegally extracting information from the network, spreading computer viruses and worms, and attacking various services provided in the network. Electronic fraud occurs whenever information that is conveyed electronically is either misrepresented or illegally intercepted for fraudulent purposes. The information may be intercepted during its transfer over the network, or it may be illegally accessed from various information databases maintained by merchants, suppliers, or consumers conducting business electronically. These databases usually store sensitive and vulnerable information exchanged in electronic business transactions, such as credit card numbers, personal identification numbers, and billing records.

Today, examples of network intrusion and electronic fraud abound in virtually every business with an electronic presence. For example, the financial services industry is subject to credit card fraud and money laundering, the telecommunications industry is subject to cellular phone fraud, and the health care industry is subject to the misrepresentation of medical claims. All of these industries are subject to network intrusion attacks. Business losses due to electronic fraud and network intrusion have been escalating significantly since the Internet and the World Wide Web (hereinafter "the web") have become the preferred medium for business transactions for many merchants, suppliers, and consumers. Conservative estimates foresee losses in web-based business transactions to be in the billion-dollar range.

When business transactions are conducted on the web, merchants and suppliers provide consumers an interactive "web site" that typically displays information about products and contains forms that may be used by consumers and other merchants for purchasing the products and entering sensitive financial information required for the purchase. The web site is accessed by users by means of "web browser software", such as Internet Explorer, available from Microsoft Corporation, of Redmond, Wash., that is installed on the users' computer.

Under the control of a user, the web browser software establishes a connection over the Internet between the user's computer and a "web server". A web server consists of one or more machines running special purpose software for serving the web site, and maintains a database for storing the information displayed and collected on the web page. The connection between the user's computer and the server is used to transfer any sensitive information displayed or entered in the web site between the user's computer and the web server. It is during this transfer that most fraudulent activities on the Internet occur.

To address the need to prevent and detect network intrusion and electronic fraud, a variety of new technologies have been developed. Technologies for detecting and preventing network intrusion involve anomaly detection systems and signature detection systems.

Anomaly detection systems detect network intrusion by looking for user's or system's activity that does not correspond to a normal activity profile measured for the network and for the computers in the network. The activity profile is formed based on a number of statistics collected in the network, including CPU utilization, disk and file activity, user logins, TCP/IP log files, among others. The statistics must be continually updated to reflect the current state of the network. The systems may employ neural networks, data mining, agents, or expert systems to construct the activity profile. Examples of anomaly detection systems include the Computer Misuse Detection System (CMDS), developed by Science Applications International Corporation, of San Diego, Calif., and the Intrusion Detection Expert System (IDES), developed by SRI International, of Menlo Park, Calif.

With networks rapidly expanding, it becomes extremely difficult to track all the statistics required to build a normal activity profile. In addition, anomaly detection systems tend to generate a high number of false alarms, causing some users in the network that do not fit the normal activity profile to be wrongly suspected of network intrusion. Sophisticated attackers may also generate enough traffic so that it looks "normal" when in reality it is used as a disguise for later network intrusion.

Another way to detect network intrusion involves the use of signature detection systems that look for activity that corresponds to known intrusion techniques, referred to as signatures, or system vulnerabilities. Instead of trying to match user's activity to a normal activity profile like the anomaly detection systems, signature detection systems attempt to match user's activity to known abnormal activity that previously resulted in an intrusion. While these systems are very effective at detecting network intrusion without generating an overwhelming number of false alarms, they must be designed to detect each possible form of intrusion and thus must be constantly updated with signatures of new attacks. In addition, many signature detection systems have narrowly defined signatures that prevent them from detecting variants of common attacks. Examples of signature detection systems include the NetProwler system, developed by Symantec, of Cupertino, Calif., and the Emerald system, developed by SRI International, of Menlo Park, Calif.

To improve the performance of network detection systems, both anomaly detection and signature detection techniques have been employed together. A system that employs both includes the Next-Generation Intrusion Detection Expert System (NIDES), developed by SRI International, of Menlo Park, Calif. The NIDES system includes a rule-based signature analysis subsystem and a statistical profile-based anomaly detection subsystem. The NIDES rule-based signature analysis subsystem employs expert rules to characterize known intrusive activity represented in activity logs, and raises alarms as matches are identified between the observed activity logs and the rule encodings. The statistical subsystem maintains historical profiles of usage per user and raises an alarm when observed activity departs from established patterns of usage for an individual. While the NIDES system has better detection rates than other purely anomaly-based or signature-based detection systems, it still suffers from a considerable number of false alarms and difficulty in updating the signatures in real-time.

Some of the techniques used by network intrusion detection systems can also be applied to detect and prevent electronic fraud. Technologies for detecting and preventing electronic fraud involve fraud scanning and verification systems, the Secure Electronic Transaction (SET) standard, and various intelligent technologies, including neural networks, data mining, multi-agents, and expert systems with case-based reasoning (CBR) and rule-based reasoning (RBR).

Fraud scanning and verification systems detect electronic fraud by comparing information transmitted by a fraudulent user against information in a number of verification databases maintained by multiple data sources, such as the United States Postal Service, financial institutions, insurance companies, telecommunications companies, among others. The verification databases store information corresponding to known cases of fraud so that when the information sent by the fraudulent user is found in the verification database, fraud is detected. An example of a fraud verification system is the iRAVES system (the Internet Real Time Address Verification Enterprise Service) developed by Intelligent Systems, Inc., of Washington, D.C.

A major drawback of these verification systems is that keeping the databases current requires the databases to be updated whenever new fraudulent activity is discovered. As a result, the fraud detection level of these systems is low since new fraudulent activities occur very often and the database gets updated only when the new fraud has already occurred and has been discovered by some other method. The verification systems simply detect electronic fraud, but cannot prevent it.

In cases of business transactions on the web involving credit card fraud, the verification systems can be used jointly with the Secure Electronic Transaction (SET) standard proposed by the leading credit card companies Visa, of Foster City, Calif., and Mastercard, of Purchase, N.Y. The SET standard provides an extra layer of protection against credit card fraud by linking credit cards with a digital signature that fulfills the same role as the physical signature used in traditional credit card transactions. Whenever a credit card transaction occurs on a web site complying with the SET standard, a digital signature is used to authenticate the identity of the credit card user.

The SET standard relies on cryptography techniques to ensure the security and confidentiality of the credit card transactions performed on the web, but it cannot guarantee that the digital signature is being misused to commit fraud. Although the SET standard reduces the costs associated with fraud and increases the level of trust on online business transactions, it does not entirely prevent fraud from occurring. Additionally, the SET standard has not been widely adopted due to its cost, computational complexity, and implementation difficulties.

To improve fraud detection rates, more sophisticated technologies such as neural networks have been used. Neural networks are designed to approximate the operation of the human brain, making them particularly useful in solving problems of identification, forecasting, planning, and data mining. A neural network can be considered as a black box that is able to predict an output pattern when it recognizes a given input pattern. The neural network must first be "trained" by having it process a large number of input patterns and showing it what output resulted from each input pattern. Once trained, the neural network is able to recognize similarities when presented with a new input pattern, resulting in a predicted output pattern. Neural networks are able to detect similarities in inputs, even though a particular input may never have been seen previously.

There are a number of different neural network algorithms available, including feed forward, back propagation, Hopfield, Kohonen, simplified fuzzy adaptive resonance (SFAM), among others. In general, several algorithms can be applied to a particular application, but there usually is an algorithm that is better suited to some kinds of applications than others. Current fraud detection systems using neural networks generally offer one or two algorithms, with the most popular choices being feed forward and back propagation. Feed forward networks have one or more inputs that are propagated through a variable number of hidden layers or predictors, with each layer containing a variable number of neurons or nodes, until the inputs finally reach the output layer, which may also contain one or more output nodes. Feed-forward neural networks can be used for many tasks, including classification and prediction. Back propagation neural networks are feed forward networks that are traversed in both the forward (from the input to the output) and backward (from the output to the input) directions while minimizing a cost or error function that determines how well the neural network is performing with the given training set. The smaller the error and the more extensive the training, the better the neural network will perform. Examples of fraud detection systems using back propagation neural networks include Falcon™, from HNC Software, Inc., of San Diego, Calif., and PRISM, from Nestor, Inc., of Providence, R.I.

These fraud detection systems use the neural network as a predictive model to evaluate sensitive information transmitted electronically and identify potentially fraudulent activity based on learned relationships among many variables. These relationships enable the system to estimate a probability of fraud for each business transaction, so that when the probability exceeds a predetermined amount, fraud is detected. The neural network is trained with data drawn from a database containing historical data on various business transactions, resulting in the creation of a set of variables that have been empirically determined to form more effective predictors of fraud than the original historical data. Examples of such variables include customer usage pattern profiles, transaction amount, percentage of transactions during different times of day, among others.

For neural networks to be effective in detecting fraud, there must be a large database of known cases of fraud and the methods of fraud must not change rapidly. With new methods of electronic fraud appearing daily on the Internet, neural networks are not sufficient to detect or prevent fraud in real-time. In addition, the time consuming nature of the training process, the difficulty of training the neural networks to provide a high degree of accuracy, and the fact that the desired output for each input needs to be known before the training begins are often prohibiting limitations for using neural networks when fraud is either too close to normal activity or constantly shifting as the fraudulent actors adapt to changing surveillance or technology.

To improve the detection rate of fraudulent activities, fraud detection systems have adopted intelligent technologies such as data mining, multi-agents, and expert systems with case-based reasoning (CBR) and rule-based reasoning (RBR). Data mining involves the analysis of data for relationships that have not been previously discovered. For example, the use of a particular credit card to purchase gourmet cooking books on the web may reveal a correlation with the purchase by the same credit card of gourmet food items. Data mining produces several data relationships, including: (1) associations, wherein one event is correlated to another event (e.g., purchase of gourmet cooking books close to the holiday season); (2) sequences, wherein one event leads to another later event (e.g., purchase of gourmet cooking books followed by the purchase of gourmet food ingredients); (3) classification, i.e., the recognition of patterns and a resulting new organization of data (e.g., profiles of customers who make purchases of gourmet cooking books); (4) clustering, i.e., finding and visualizing groups of facts not previously known; and (5) forecasting, i.e., discovering patterns in the data that can lead to predictions about the future.

Data mining is used to detect fraud when the data being analyzed does not correspond to any expected profile of previously found relationships. In the credit card example, if the credit card is stolen and suddenly used to purchase an unexpected number of items at odd times of day that do not correspond to the previously known customer profile or cannot be predicted based on the purchase patterns, a suspicion of fraud may be raised. Data mining can be used to both detect and prevent fraud. However, data mining has the risk of generating a high number of false alarms if the predictions are not done carefully. An example of a system using data mining to detect fraud includes the ScorXPRESS system developed by Advanced Software Applications, of Pittsburgh, Pa. The system combines data mining with neural networks to quickly detect fraudulent business transactions on the web.

Another intelligent technology that can be used to detect and prevent fraud includes the multi-agent technology. An agent is a program that gathers information or performs some other service without the user's immediate presence and on some regular schedule. A multi-agent technology consists of a group of agents, each one with an expertise interacting with each other to reach their goals. Each agent possesses assigned goals, behaviors, attributes, and a partial representation of their environment. Typically, the agents behave according to their assigned goals, but also according to their observations, acquired knowledge, and interactions with other agents. Multi-agents are self-adaptive, make effective changes at run-time, and react to new and unknown events and conditions as they arise.

These capabilities make multi-agents well suited for detecting electronic fraud. For example, multi-agents can be associated with a database of credit card numbers to classify and act on incoming credit card numbers from new electronic business transactions. The agents can be used to compare the latest transaction of the credit card number with its historical information (if any) on the database, to form credit card users' profiles, and to detect abnormal behavior of a particular credit card user. Multi-agents have also been applied to detect fraud in personal communication systems (*A Multi-Agent Systems Approach for Fraud Detection in Personal Communication Systems*, S. Abu-Hakima, M. Toloo, and T. White, AAAI-97 Workshop), as well as to detect network intrusion. The main problem with using multi-agents for detecting and preventing electronic fraud and network intrusion is that they are usually asynchronous, making it difficult to establish how the different agents are going to interact with each other in a timely manner.

In addition to neural networks, data mining, and multi-agents, expert systems have also been used to detect electronic fraud. An expert system is a computer program that simulates the judgement and behavior of a human or an organization that has expert knowledge and experience in a particular field. Typically, such a system employs rule-based reasoning (RBR) and/or case-based reasoning (CBR) to reach a solution to a problem. Rule-based systems use a set of "if-then" rules to solve the problem, while case-based systems solve the problem by relying on a set of known problems or cases solved in the past. In general, case-based systems are more efficient than rule-based systems for problems involving large data sets because case-based systems search the space of what already has happened rather than the intractable space of what could happen. While rule-based systems are very good for capturing broad trends, case-based systems can be used to fill in the exceptions to the rules.

Both rule-based and case-based systems have been designed to detect electronic fraud. Rule-based systems have also been designed to detect network intrusion, such as the Next-Generation Intrusion Detection Expert System (NIDES), developed by SRI International, of Menlo Park, Calif. Examples of rule-based fraud detection systems include the Internet Fraud Screen (IFS) system developed by CyberSource Corporation, of Mountain View, Calif., and the FraudShield™ system, developed by ClearCommerce Corporation, of Austin, Tex. An example of a case-based fraud detection system is the Minotaur™ system, developed by Neuralt Technologies, of Hampshire, UK.

These systems combine the rule-based or casebased technologies with neural networks to assign fraud risk scores to a given transaction. The fraud risk scores are compared to a threshold to determine whether the transaction is fraudulent or not. The main disadvantage of these systems is that their fraud detection rates are highly dependent on the set of rules and cases used. To be able to identify all cases of fraud would require a prohibitive large set of rules and known cases. Moreover, these systems are not easily adaptable to new methods of fraud as the set of rules and cases can become quickly outdated with new fraud tactics.

To improve their fraud detection capability, fraud detection systems based on intelligent technologies usually combine a number of different technologies together. Since each intelligent technology is better at detecting certain types of fraud than others, combining the technologies together enables the system to cover a broader range of fraudulent transactions. As a result, higher fraud detection rates are achieved. Most often these systems combine neural networks with expert systems and/or data mining. As of today, there is no system in place that integrates neural networks, data mining, multi-agents, expert systems, and other technologies such as fuzzy logic and genetic algorithms to provide a more powerful fraud detection solution.

In addition, current fraud detection systems are not always capable of preventing fraud in real-time. These systems usually detect fraud after it has already occurred, and when they attempt to prevent fraud from occurring, they often produce false alarms. Furthermore, most of the current fraud detection systems are not self-adaptive, and require constant updates to detect new cases of fraud. Because the systems usually employ only one or two intelligent technologies that are targeted for detecting only specific cases of fraud, they cannot be used across multiple industries to achieve high fraud detection rates with different types of electronic fraud. In addition, current fraud detection systems are designed specifically for detecting and preventing electronic fraud and are therefore not able to detect and prevent network intrusion as well.

In view of the foregoing drawbacks of current methods for detecting and preventing electronic fraud and network intrusion, it would be desirable to provide systems and methods for dynamic detection and prevention of electronic fraud and network intrusion that are able to detect and prevent fraud and network intrusion across multiple networks and industries.

It further would be desirable to provide systems and methods for dynamic detection and prevention of electronic fraud and network intrusion that employ an integrated set of intelligent technologies including neural networks, data mining, multi-agents, case-based reasoning, rule-based reasoning, fuzzy logic, constraint programming, and genetic algorithms.

It still further would be desirable to provide systems and methods for dynamic detection and prevention of electronic fraud and network intrusion that are self-adaptive and detect and prevent fraud and network intrusion in real-time.

It also would be desirable to provide systems and methods for dynamic detection and prevention of electronic fraud and network intrusion that are less sensitive to known or unknown different types of fraud and network intrusion attacks.

It further would be desirable to provide systems and methods for dynamic detection and prevention of electronic fraud and network intrusion that deliver a software solution to various web servers.

SUMMARY OF THE INVENTION

In view of the foregoing, it is an object of the present invention to provide systems and methods for dynamic detection and prevention of electronic fraud and network intrusion that are able to detect and prevent fraud and network intrusion across multiple networks and industries.

It is another object of the present invention to provide systems and methods for dynamic detection and prevention of electronic fraud and network intrusion that employ an integrated set of intelligent technologies including neural networks, data mining, multi-agents, case-based reasoning, rule-based reasoning, fuzzy logic, constraint programming, and genetic algorithms.

It is a further object of the present invention to provide systems and methods for dynamic detection and prevention of electronic fraud and network intrusion that are self-adaptive and detect and prevent fraud and network intrusion in real-time.

It is also an object of the present invention to provide systems and methods for dynamic detection and prevention of electronic fraud and network intrusion that are less sensitive to known or unknown different types of fraud and network intrusion attacks.

It is a further object of the present invention to provide systems and methods for dynamic detection and prevention of electronic fraud and network intrusion that deliver a software solution to various web servers.

These and other objects of the present invention are accomplished by providing systems and methods for dynamic detection and prevention of electronic fraud and network intrusion that use an integrated set of intelligent technologies to detect and prevent electronic fraud and network intrusion in real-time. The systems and methods consist of a single and common software solution that can be used to detect both electronic fraud and network intrusion across multiple networks and industries. The software solution is less sensitive to known or unknown different types of fraud or network intrusion attacks so that it achieves higher fraud and network intrusion detection and prevention success rates than the current systems available. In addition, the software solution is capable of detecting new incidents of fraud and network intrusion without reprogramming.

In a preferred embodiment, the systems and methods of the present invention involve a software solution consisting of three main components: (1) a fraud detection and prevention model component (also referred to herein as "the model"); (2) a model training component; and (3) a model querying component.

The fraud detection and prevention model is a program that takes data associated with an electronic transaction and decides whether the transaction is fraudulent in real-time. Analogously, the model takes data associated with a user's network activity and decides whether the user is breaching network security. The model consists of an extensible collection of integrated sub-models, each of which contributes to the final decision. The model contains four default sub-models: (1) data mining sub-model; (2) neural network sub-model; (3) multi-agent sub-model; and (4) case-based reasoning sub-model. Extensions to the model include: (1) a rule-based reasoning sub-model; (2) a fuzzy logic sub-model; (3) a sub-model based on genetic algorithms; and (4) a constraint programming sub-model.

The model training component consists of an interface and routines for training each one of the sub-models. The sub-models are trained based on a database of existing electronic transactions or network activity provided by the client. The client is a merchant, supplier, or consumer conducting business electronically and running the model to detect and prevent electronic fraud or network intrusion. Typically, the database contains a variety of tables, with each table containing one or more data categories or fields in its columns. Each row of the table contains a unique record or instance of data for the fields defined by the columns. For example, a typical electronic commerce database for web transactions would include a table describing customers with columns for name, address, phone numbers, and so forth. Another table would describe orders by the product, customer, date, sales price, etc. A single fraud detection and prevention model can be created for several tables in the database.

Each sub-model uses a single field in the database as its output class and all the other fields as its inputs. The output class can be a field pointing out whether a data record is fraudulent or not, or it can be any other field whose value is to be predicted by the sub-models. The sub-models are able to recognize similarities in the data when presented with a new input pattern, resulting in a predicted output. When a new electronic transaction is conducted by the client, the model uses the data associated with the transaction and automatically determines whether the transaction is fraudulent, based on the combined predictions of the sub-models.

A model training interface is provided for selecting the following model parameters: (1) the tables containing the data for training the model; (2) a field in the tables to be designated as the output for each sub-model; and (3) the sub-models to be used in the model. When a field is selected as the output for each sub-model, the interface displays all the distinct values it found in the tables for that given field.

The client then selects the values that are considered normal values for that field. The values not considered normal for the field may be values not encountered frequently, or even, values that are erroneous or fraudulent. For example, in a table containing financial information of bank customers, the field selected for the sub-models' output may be the daily balance on the customer's checking account. Normal values for that field could be within a range of average daily balances, and abnormal values could indicate unusual account activity or fraudulent patterns in a given customer's account.

Upon selection of the model parameters, the model is generated and saved in a set of binary files. The results of the model may also be displayed to the client in a window showing the details of what was created for each sub-model. For example, for the data mining sub-model, the window would display a decision tree created to predict the output, for the multi-agent sub-model, the window would display the relationships between the fields, for the neural network sub-model, the window would display how data relationships were used in training the neural network, and for the case-based reasoning sub-model the window would display the list of generic cases created to represent the data records in the training database. The model training interface also enables a user to visualize the contents of the database and of the tables in the database, as well as to retrieve statistics of each field in a given table.

The model can be queried automatically for each incoming transaction, or it can be queried offline by means of a model query form. The model query form lists all the fields in the tables that are used as the model inputs, and allows the client to test the model for any input values. The client enters values for the inputs and queries the model on those inputs to find whether the values entered determine a fraudulent transaction.

Advantageously, the present invention successfully detects and prevents electronic fraud and network intrusion in real-time. In addition, the present invention is not sensitive to known or unknown different types of fraud or network intrusion attacks, and can be used to detect and prevent fraud and network intrusion across multiple networks and industries.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which:

FIG. 15 is an illustrative table of distance measures that can be used in the neural network training process;

FIG. 25 is an illustrative table of global similarity measures used by the case-based reasoning sub-model;

FIG. 26 is an illustrative table of local similarity measures used by the case-based reasoning sub-model;

DETAILED DESCRIPTION OF THE INVENTION

Figure 1:
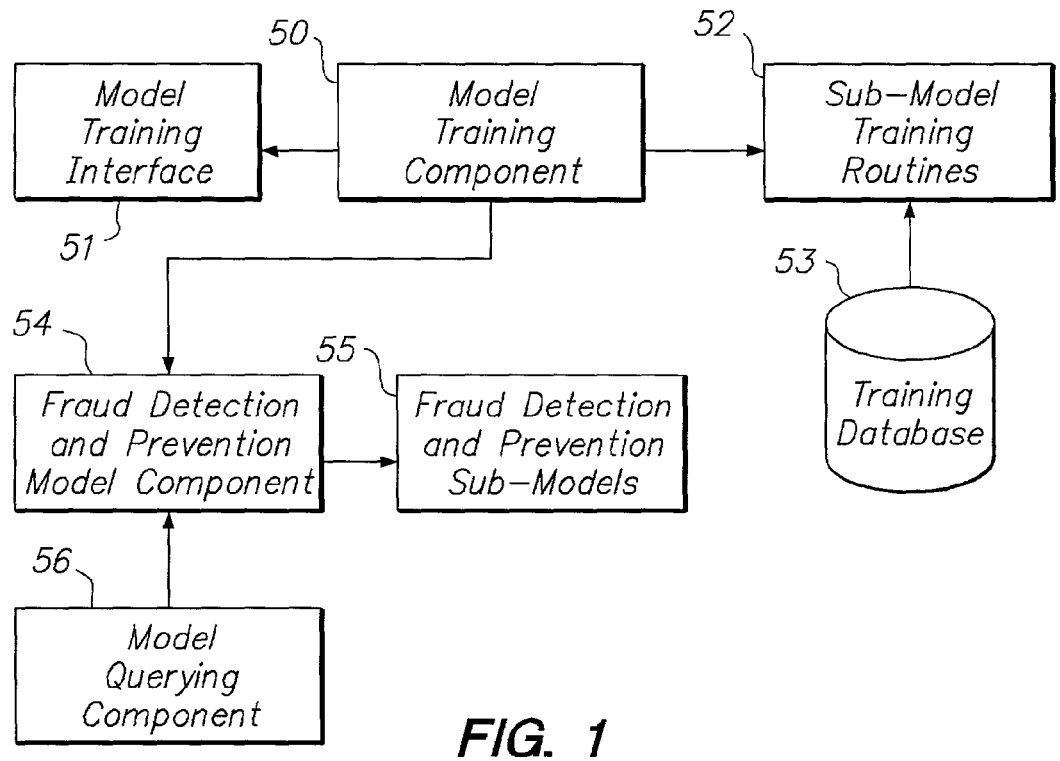
FIG. 1 is a schematic view of the software components of the present invention.

Referring to FIG. 1, a schematic view of the software components of the present invention is described. The software components of the present invention consist of: (1) fraud detection and prevention model component 54; (2) model training component 50; and (3) model querying component 56. Software components, as used herein, are software routines or objects that perform various functions and may be used alone or in combination with other components. Components may also contain an interface definition, a document or a portion of a document, data, digital media, or any other type of independently deployable content that may be used alone or in combination to build applications or content for use on a computer. A component typically encapsulates a collection of related data or functionality, and may comprise one or more files.

Fraud detection and prevention model component 54 is a program that takes data associated with an electronic transaction and decides whether the transaction is fraudulent in real-time. Model 54 also takes data associated with network usage and decides whether there is network intrusion. Model 54 consists of an extensible collection of integrated sub-models 55, each of which contributes to the final decision. Each sub-model uses a different intelligent technology to predict an output from the data associated with the electronic transaction or network usage. The output may denote whether the electronic transaction is fraudulent or not, or it may denote any other field in the data for which a prediction is desired.

Model training component 50 consists of model training interface 51 and routines 52 for training each one of sub-models 55. Sub-models 55 are trained based on training database 53 of existing electronic transactions or network activity profiles provided by the client. The client is a merchant, supplier, educational institution, governmental institution, or individual consumer conducting business electronically and running model 54 to detect and prevent electronic fraud and/or to detect and prevent network intrusion. Typically, database 53 contains a variety of tables, with each table containing one or /more data categories or fields in its columns. Each row of a table contains a unique record or instance of data for the fields defined by the columns. For example, a typical electronic commerce database for web transactions would include a table describing a customer with columns for name, address, phone numbers, and so forth. Another table would describe an order by the product, customer, date, sales price, etc. The database records need not be localized on any one machine but may be inherently distributed in the network.

Each one of sub-models 55 uses a single field in training database 53 as its output and all the other fields as its inputs. The output can be a field pointing out whether a data record is fraudulent or not, or it can be any other field whose value is to be predicted by sub-models 55. Sub-models 55 are able to recognize similarities in the data when presented with a new input pattern, resulting in a predicted output. When a new electronic transaction is conducted by the client, model 54 uses the data associated with the transaction and automatically determines whether the transaction is fraudulent, based on the combined predictions of the sub-models.

Model training interface 51 is provided for selecting the following model parameters: (1) the training tables in database 53 containing the data for training model 54; (2) a field in the training tables to be designated as the output for each one of sub-models 55; and (3) sub-models 55 to be used in model 54. When the field is selected, interface 51 displays all the distinct values it found in the training tables for that given field. The client then selects the values that are considered normal values for that field. The values not considered normal for the field may be values not encountered frequently, or even, values that are erroneous or fraudulent. For example, in a table containing financial information of bank customers, the field selected for the model output may be the daily balance on the customer's checking account. Normal values for that field could be within a range of average daily balances, and abnormal values could indicate unusual account activity or fraudulent patterns in a given customer's account. Model training interface 51 enables a user to train model 54, view the results of the training process, visualize the contents of database 53 and of the tables in database 53, as well as retrieve statistics of each field in a given table.

Model querying component 56 consists of programs used to automatically query model 54 for each incoming transaction, or to query model 54 offline by means of a model query form. The model query form lists all the fields in the training tables that are used as the model inputs, and allows the client to test model 54 for any input values. The client enters values for the inputs and queries model 54 on those inputs to find whether the values entered determine a fraudulent transaction.

It should be understood by one skilled in the art that the model learns new fraud and network intrusion patterns automatically by updating the model binary files without having to repeat the entire training process. Furthermore, the model can be easily extended to incorporate additional sub-models that implement other intelligent technologies.

Figure 2:
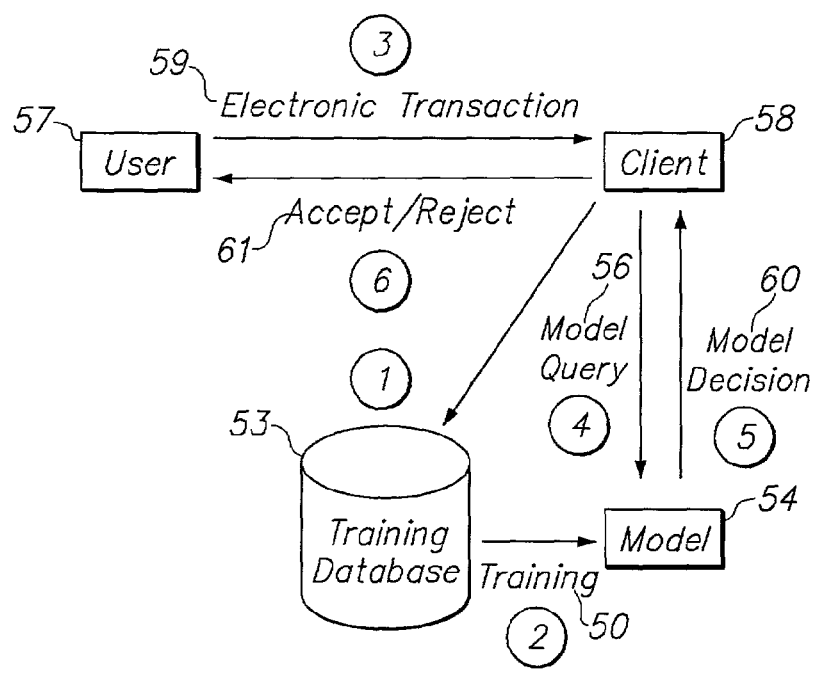
FIG. 2 is a schematic view of the system and the network environment in which the present invention operates.

Referring to FIG. 2, a schematic view of the system and the network environment in which the present invention operates is described. User 57 and client 58 may be merchants and suppliers in a variety of industries, educational institutions, governmental institutions, or individual consumers that engage in electronic transactions 59 across a variety of networks, including the Internet, Intranets, wireless networks, among others. As part of transaction 59, user 57 supplies a collection of data to client 58. The collection of data may contain personal user information, such as the user's name, address, and social security number, financial information, such as a credit card number and its expiration date, the user's host name in a network, health care claims, among others.

Client 58 has one or more computers for conducting electronic transactions. In the case of electronic transactions conducted on the web, client 58 also has web servers running a web site. For each electronic transaction client 58 conducts, model 54 is used to determine whether the transaction is fraudulent or not. Model 54 consists of a collection of routines and programs residing in a number of computers of client 58. For web-based transactions, the programs may reside on multiple web servers as well as on an single dedicated server.

Model 54 is created or trained based on training database 53 provided by client 58. Training database 53 may contain a variety of tables, with each table containing one or more data categories or fields in its columns. Each row of a table contains a unique record or instance of data for the fields defined by the columns. For example, training database 53 may include a table describing user 57 with columns for name, address, phone numbers, etc., and another table describing an order by the product, user 57, date, sales price, etc. Model 54 is trained on one or more tables in database 53 to recognize similarities in the data when presented with a new input pattern, resulting in a decision of whether the input pattern is fraudulent or not. When a new electronic transaction is conducted by client 58, model 54 uses the data associated with the transaction and automatically determines whether the transaction is fraudulent. Model 54 is self-adaptive and may be trained offline, or in real-time. Based on decision 60 returned by model 54, client 58 may accept or reject the electronic transaction by sending user 59 accept/reject message 61.

It should be understood by one skilled in the art that an electronic transaction may involve user 54 trying to establish a network connection to client 58. In this case, detecting whether the electronic transaction is fraudulent corresponds to detecting whether there is network intrusion by user 54.

I. Model Training Component

Figure 3:
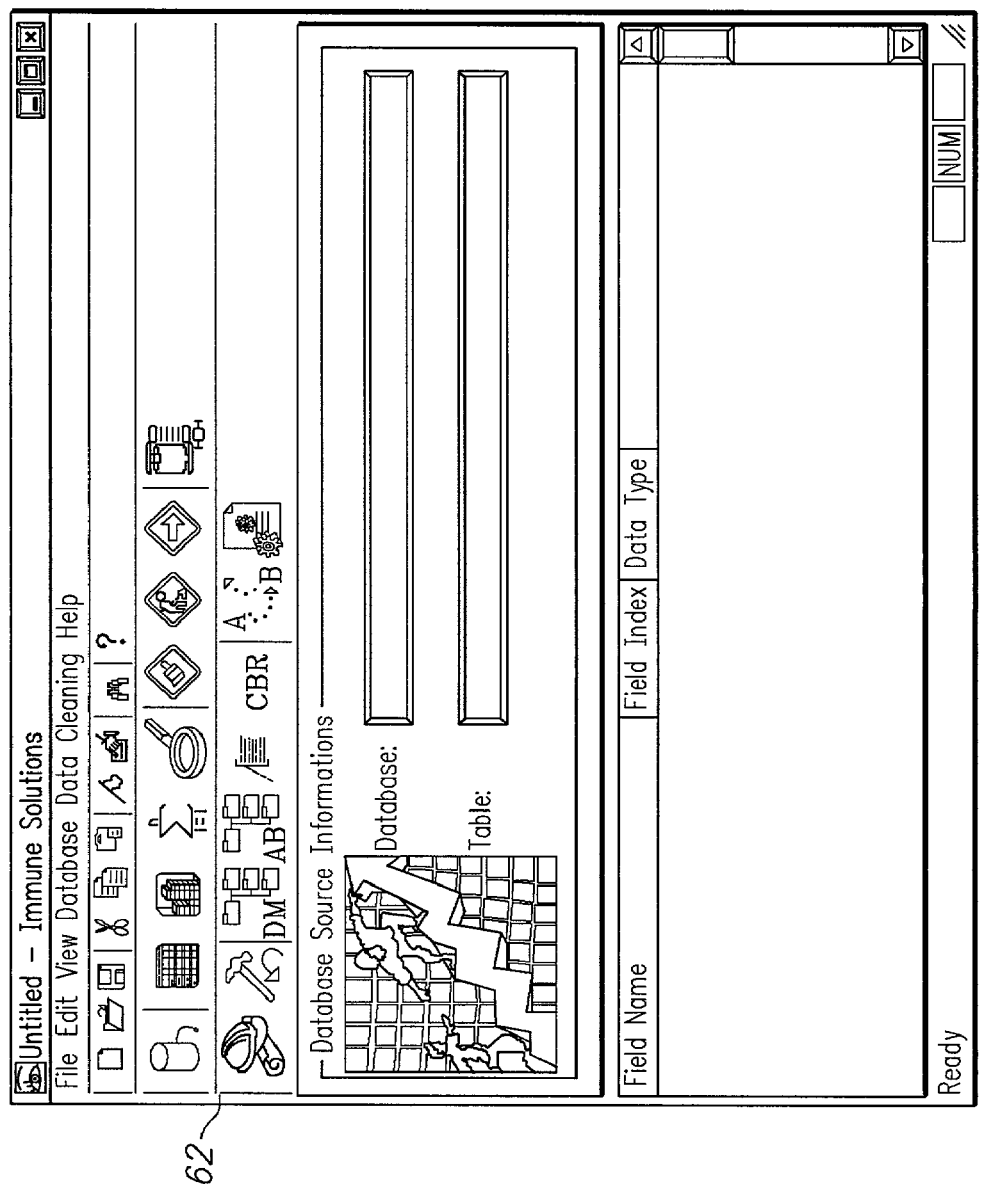
FIG. 3 is an illustrative view of a model training interface used by the client when training the model.

Referring now to FIG. 3, an illustrative view of a model training interface used by the client when training the model is described. Model training interface 62 is a graphical user interface displayed on a computer used by client 58. In a preferred embodiment, model training interface 62 contains a variety of icons, enabling client 58 to select the parameters used to train model 54, including: (1) the training tables in database 53 containing the data for training model 54; (2) a field in the training tables to be designated as the output for each sub-model; and (3) sub-models 55 to be used in model 54. Model training interface 62 also contains icons to enable the user to train model 54, view the results of the training process, visualize the contents of database 53 and of the tables in database 53, as well as retrieve statistics of each field in a given table.

Figures 4, 6:
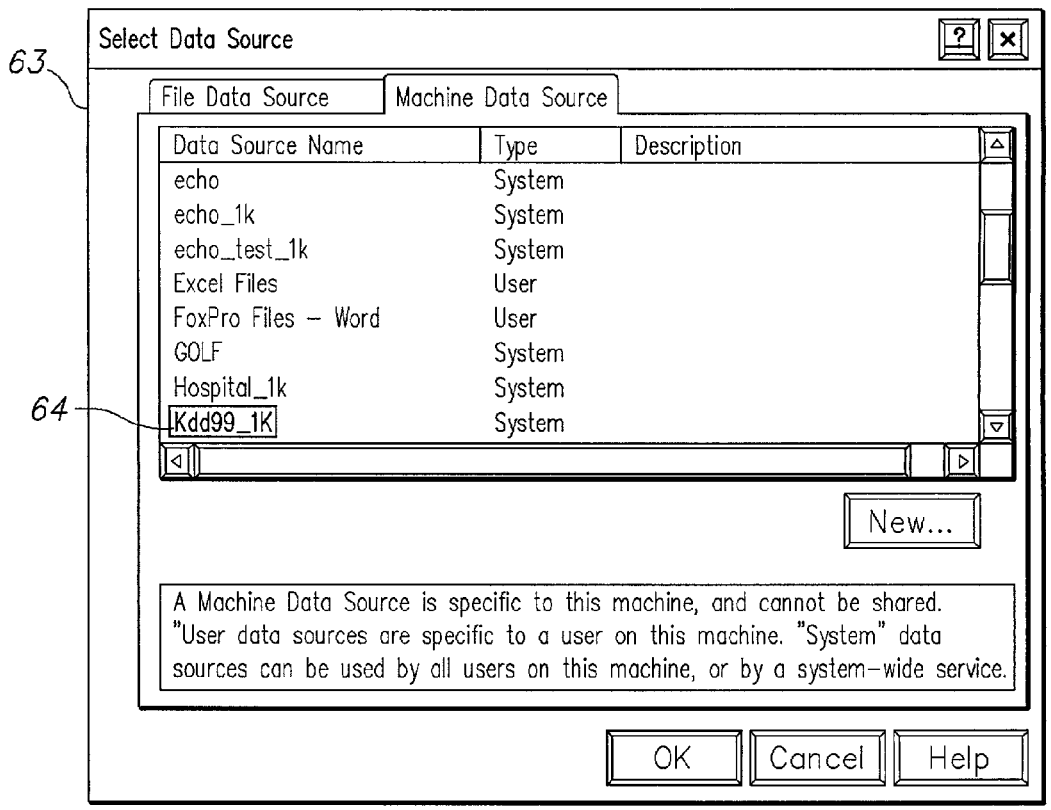
FIG. 4 is an illustrative view of a dialog box for selecting the database used for training the model.
FIG. 6 is an illustrative view of a dialog box displaying the contents of the tables used for training the model.

Referring now to FIG. 4, an illustrative view of a dialog box for selecting the database used for training the model is described. Dialog box 63 is displayed on a computer used by client 58 upon clicking on an "database selection" icon in training interface 62. Dialog box 63 displays a list of databases maintained by client 58. Client 58 selects training database 64 by highlighting it with the computer mouse. When client 58 clicks on the "OK" button in dialog box 63, dialog box 63 is closed and a training table dialog box is opened for selecting the tables in the database used for training the model. The training table dialog box lists all the tables contained the database. Client 58 selects the training tables desired by clicking on an "OK" button in the training table dialog box.

Figure 5:
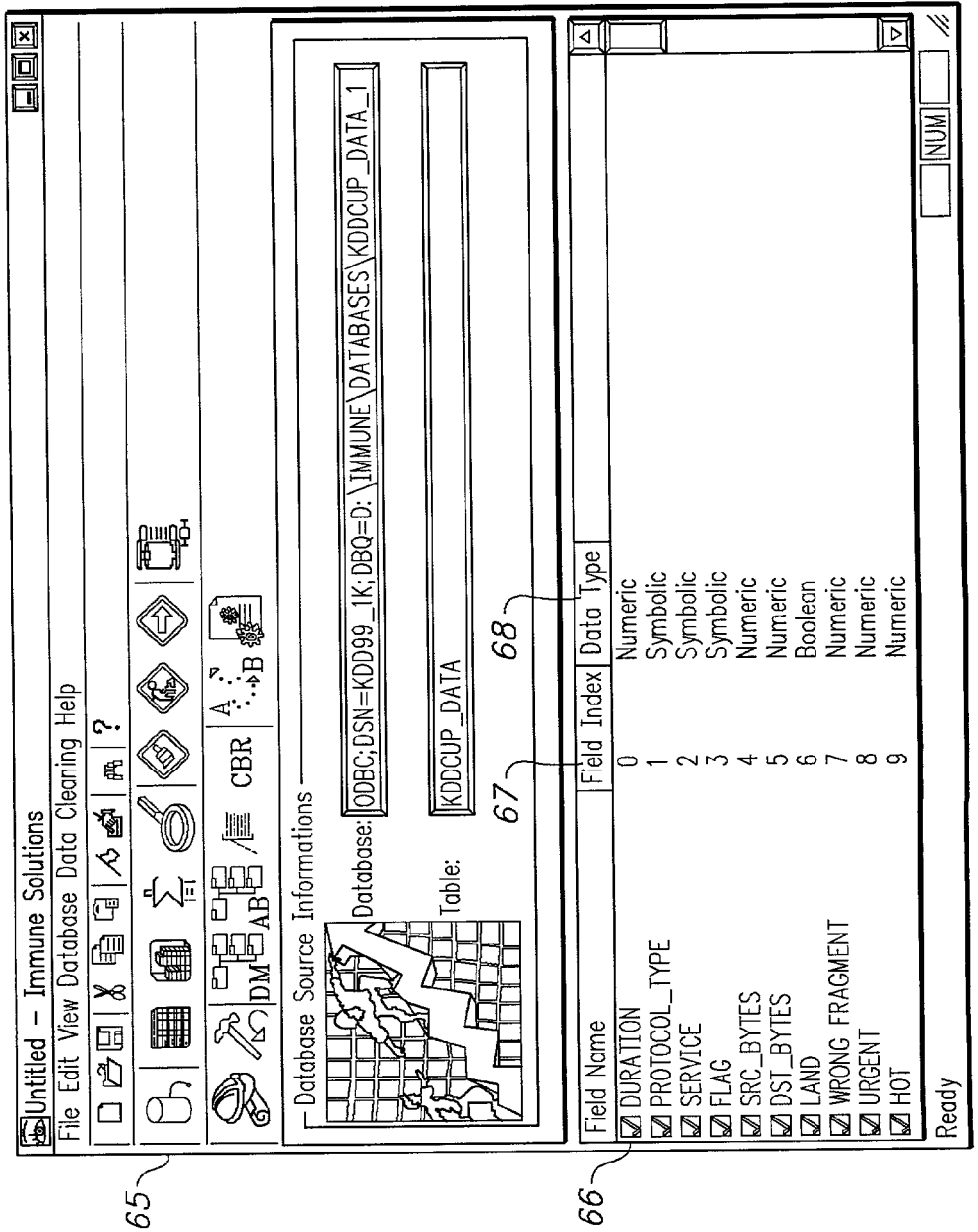
FIG. 5 is an illustrative view of the model training interface displaying the contents of the tables selected for training the model.

Referring now to FIG. 5, an illustrative view of the model training interface displaying the contents of the tables selected for training the model is described. Model training interface 65 displays the contents of the tables by field name 66, field index 67, and data type 68. Field name 66 lists all the fields in the tables, field index 67 is an index value ranging from 1 to N, where N is the total number of fields in the tables, and data type 68 is the type of the data stored in each field. Data type 68 may be numeric or symbolic.

Referring now to FIG. 6, an illustrative view of a dialog box displaying the contents of the tables used for training the model is described. Dialog box 69 displays the contents of the tables according to field names 70 and field values 71. In a preferred embodiment, a total of one hundred table records are displayed at a time to facilitate the visualization of the data in the tables.

Figure 7A:
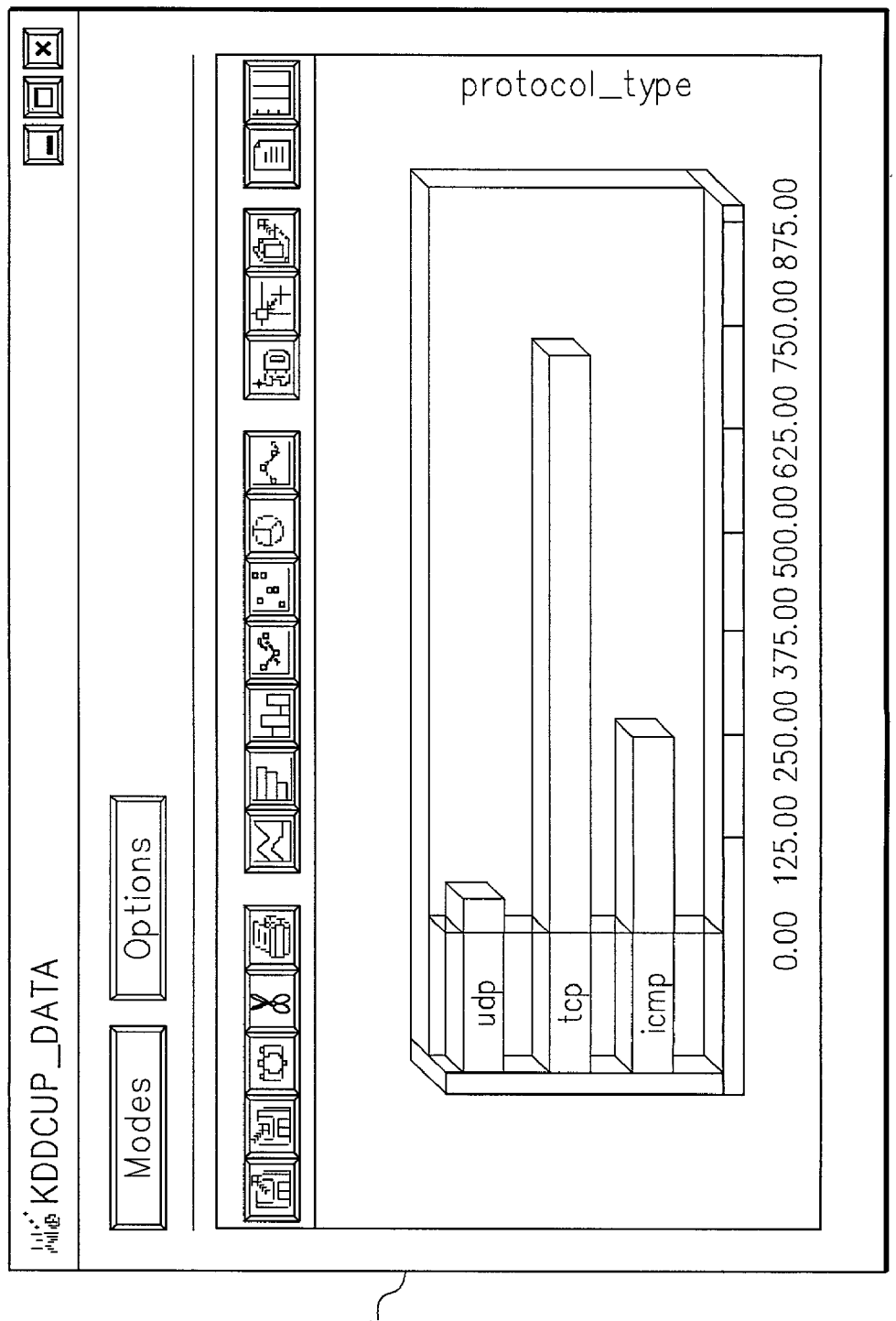
FIGS. 7A, 7B, and 7C are illustrative views of dialog boxes displaying two-dimensional and three-dimensional views of the data in the training tables.
Figure 7B:
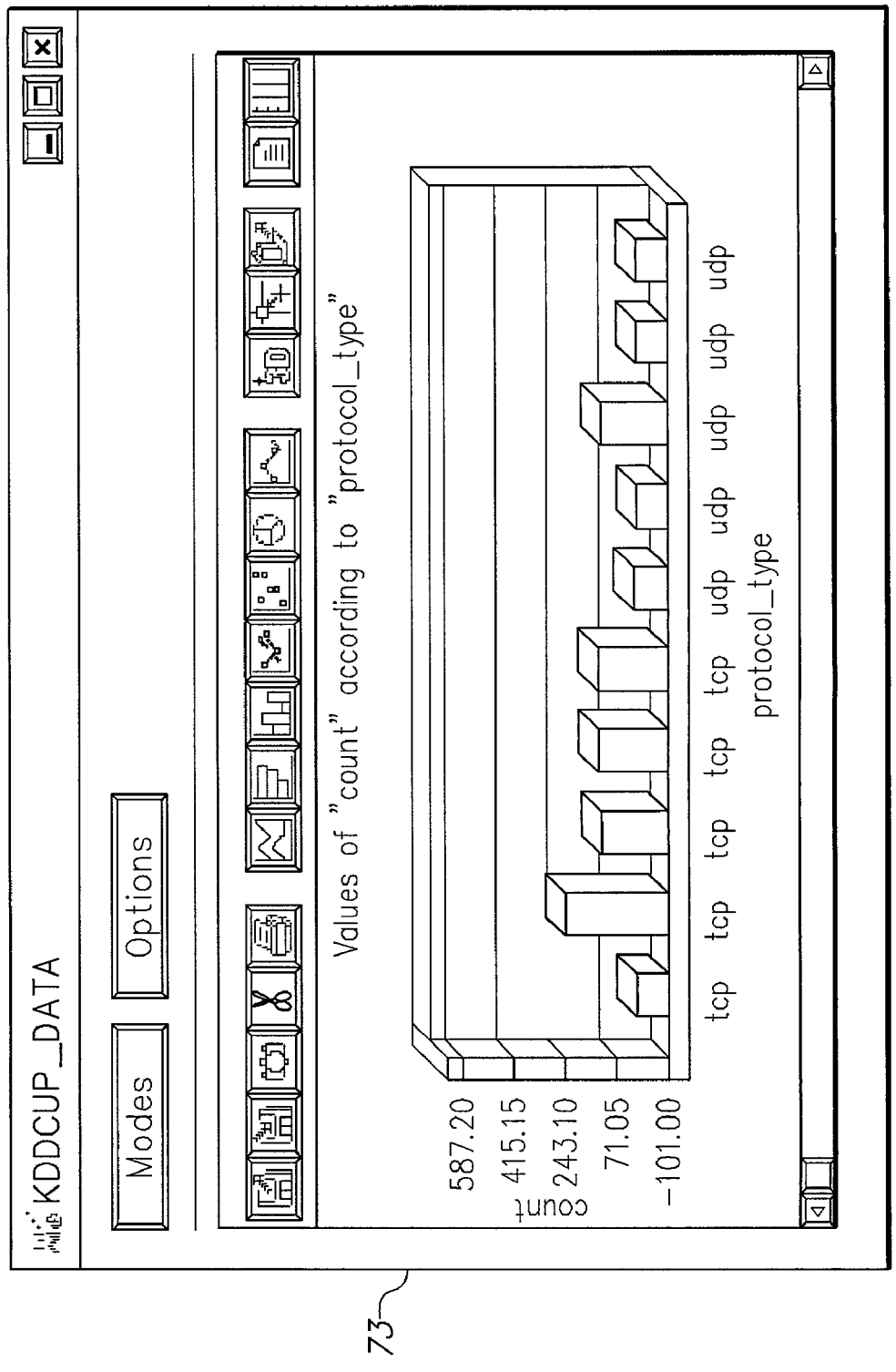
Figure 7C:
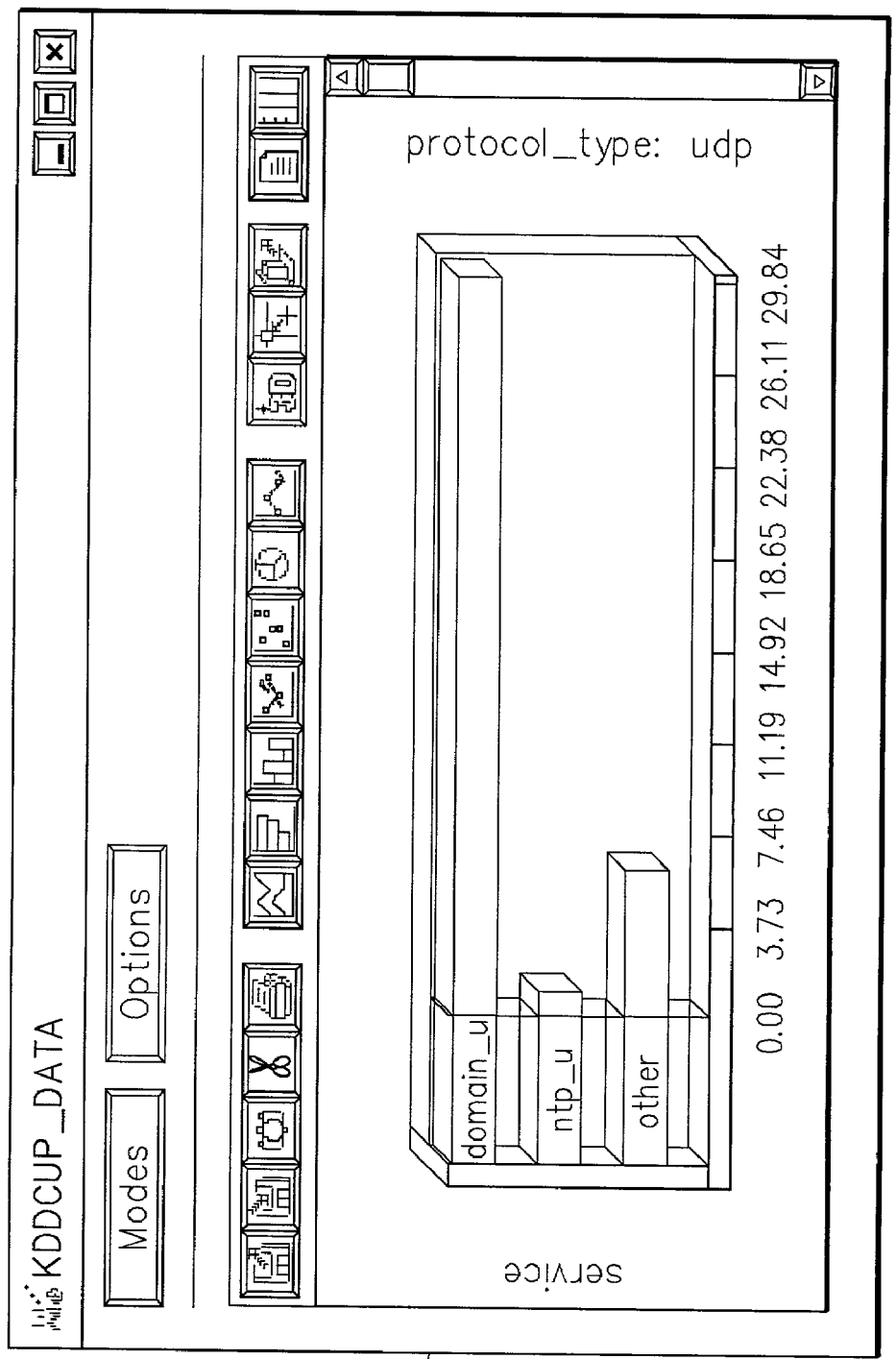

Referring now to FIGS. 7A, 7B, and 7C, illustrative views of dialog boxes displaying two-dimensional and three-dimensional views of the data in the training tables are described. Dialog box 72 in FIG. 7A displays a bar chart representing the repartition of values for a given data field. The bar chart enables client 58 to observe what values are frequent or unusual for the given data field. Dialog box 73 in FIG. 7B displays a bar chart representing the repartition of values between two data fields. Dialog box 74 in FIG. 7C displays the repartition of values for a given data field considering all the data records where another data field has a specific value. For example, dialog box 74 shows the data field "service" as a function of the symbolic data field "protocol_type" having a value of "udp".

Figure 8:
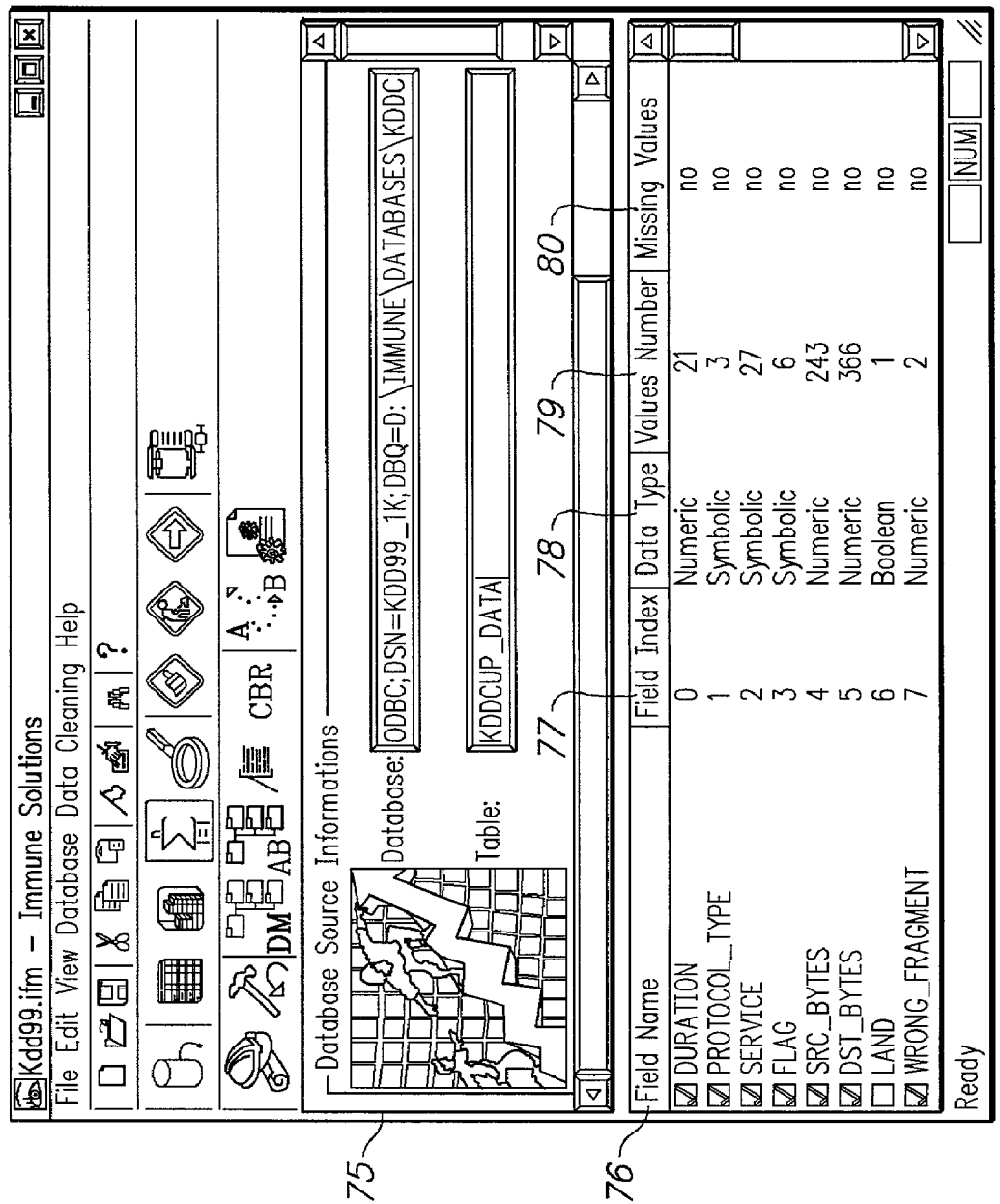
FIG. 8 is an illustrative view of the model training interface displaying the statistics of each field in the tables used for training the model.

Referring now to FIG. 8, an illustrative view of the model training interface displaying the statistics of each field in the tables used for training the model is described. Model training interface 75 displays the contents of the tables according to field names 76, field index 77, data type 78, values number 79, and missing values 80. Values number 79 shows the number of distinct values for each field in the tables, while missing values 80 indicates whether there are any missing values from a given field.

Figure 9:
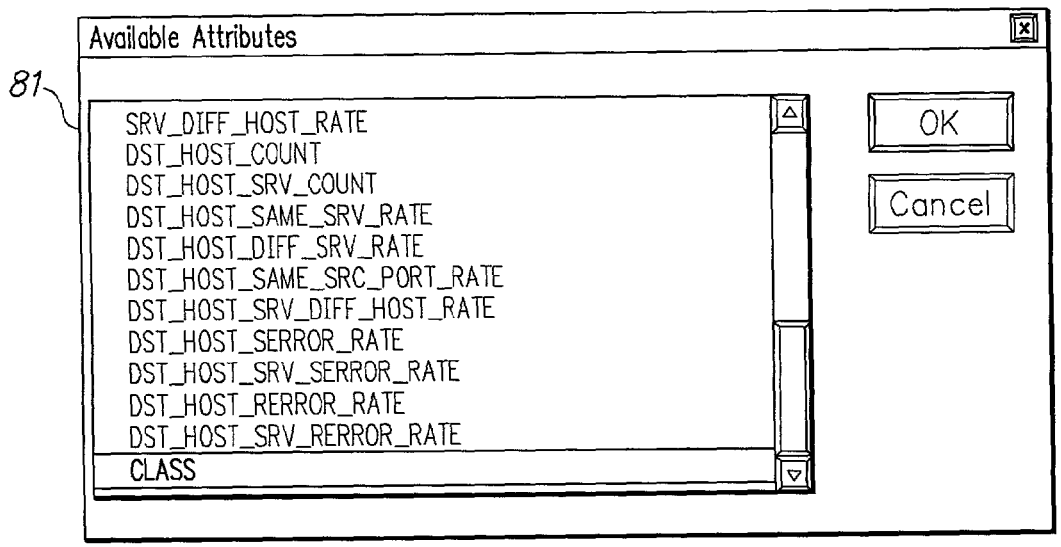
FIG. 9 is an illustrative view of a dialog box for selecting the field in the training tables to be used as the model output.

Referring now to FIG. 9, an illustrative view of a dialog box for selecting the field in the training tables to be used as the model output is described. Dialog box 81 displays all the fields in the database for the client to select the field that is to be used as the model output. All the other fields in the training tables are used as the model inputs.

Figure 10:
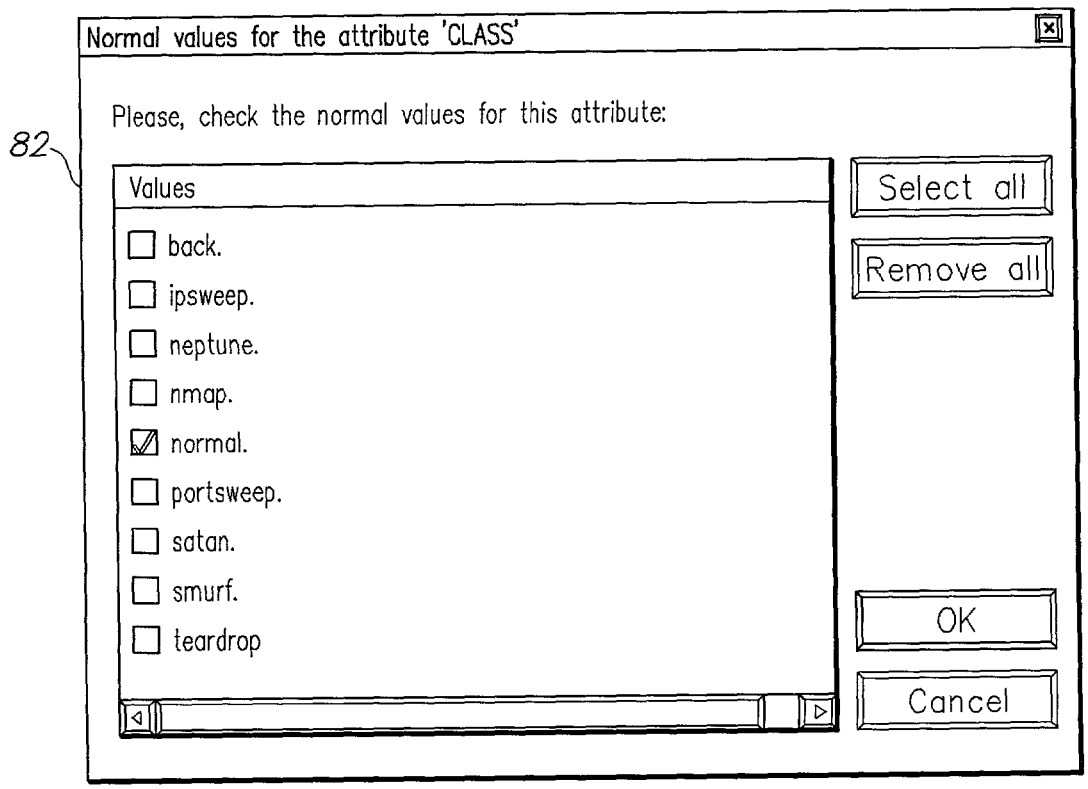
FIG. 10 is an illustrative view of a dialog box for indicating the normal values of the field selected as the model output.

Referring now to FIG. 10, an illustrative view of a dialog box for indicating the normal values of the field selected as the model output is described. Dialog box 82 displays all the distinct values found in the tables for the field selected as the model output. The client selects the values considered to be normal based on his/her own experience with the data. For example, the field output may represent the average daily balance of bank customers. The client selects the normal values based on his/her knowledge of the account histories in the bank.

II. Fraud Detection and Prevention Model Component

Figure 11:
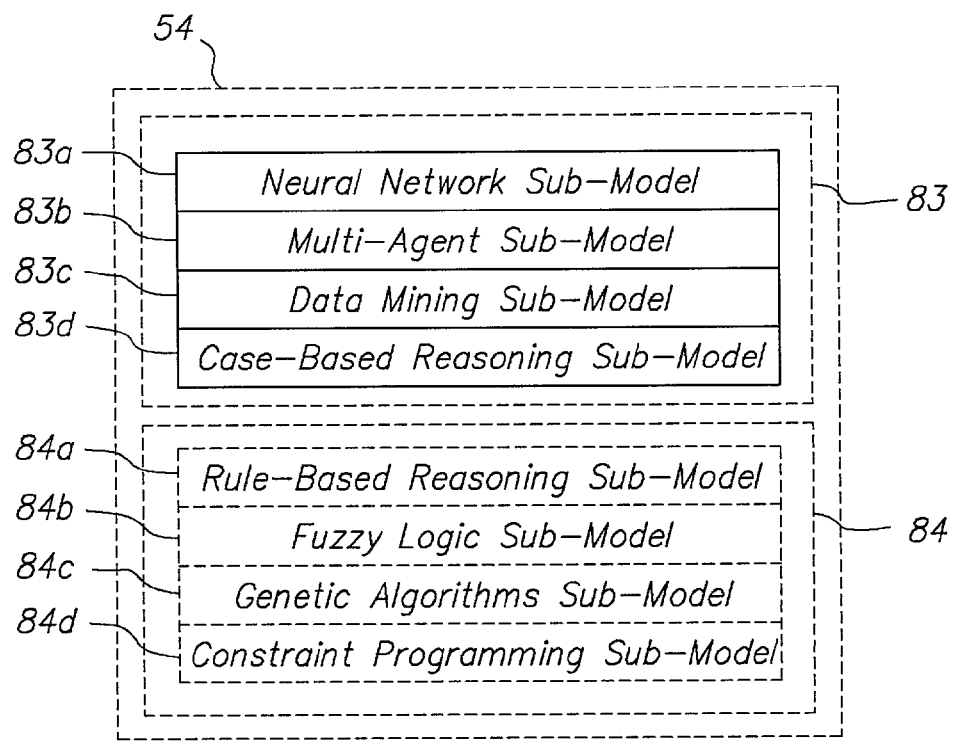
FIG. 11 is a schematic diagram of the sub-models used in the model.

Referring now to FIG. 11, a schematic diagram of the sub-models used in the model is described. Model 54 runs on two modes: automatic mode 83 and expert mode 84. Automatic mode 83 uses four default sub-models: (1) neural network sub-model 83a; (2) multi-agent sub-model 83b; (3) data mining sub-model 83c; and (4) case-based reasoning sub-model 83d. Expert mode 84 uses the four default sub-model of automatic mode 83 in addition to a collection of other sub-models, such as: (1) rule-based reasoning sub-model 84a; (2) fuzzy logic sub-model 84b; (3) genetic algorithms sub-model 84c; and (4) constraint programming sub-model 84d.

Neural Network Sub-Model

Figure 12:
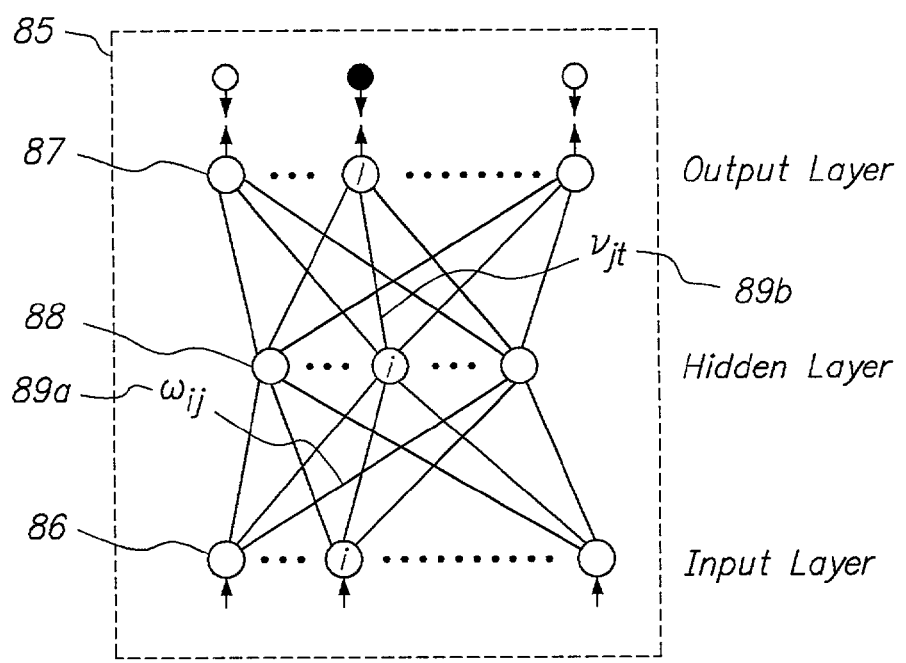
FIG. 12 is a schematic diagram of the neural network architecture used in the model.

Referring now to FIG. 12, a schematic diagram of the neural network architecture used in the model is described. Neural network 85 consists of a set of processing elements or neurons that are logically arranged into three layers: (1) input layer 86; (2) output layer 87; and (3) hidden layer 88. The architecture of neural network 85 is similar to a back propagation neural network but its training, utilization, and learning algorithms are different. The neurons in input layer 86 receive input fields from the training tables. Each of the input fields are multiplied by a weight such as weight $w_{ij}$ 89a to obtain a state or output that is passed along another weighted connection with weights $v_{ij}$ 89b between neurons in hidden layer 88 and output layer 87. The inputs to neurons in each layer come exclusively from output of neurons in a previous layer, and the output from these neurons propagate to the neurons in the following layers.

Figure 13:
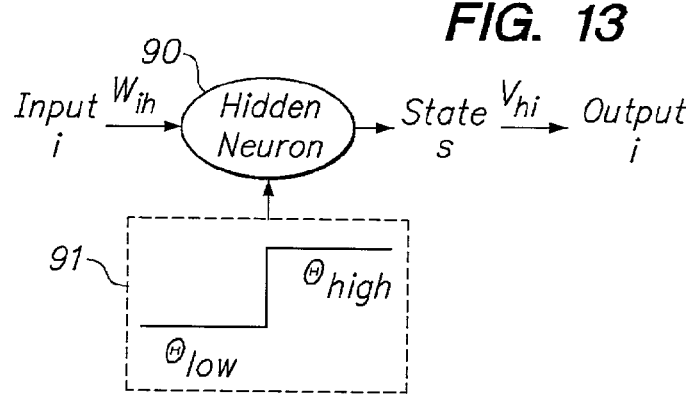
FIG. 13 is a diagram of a single neuron in the neural network used in the model.

Referring to FIG. 13, a diagram of a single neuron in the neural network used in the model is described. Neuron 90 receives input i from a neuron in a previous layer. Input i is multiplied by a weight $w_{ih}$ and processed by neuron 90 to produce state s. State s is then multiplied by weight $V_{hj}$ to produce output j that is processed by neurons in the following layers. Neuron 90 contains limiting thresholds 91 that determine how an input is propagated to neurons in the following layers.

Figure 14:
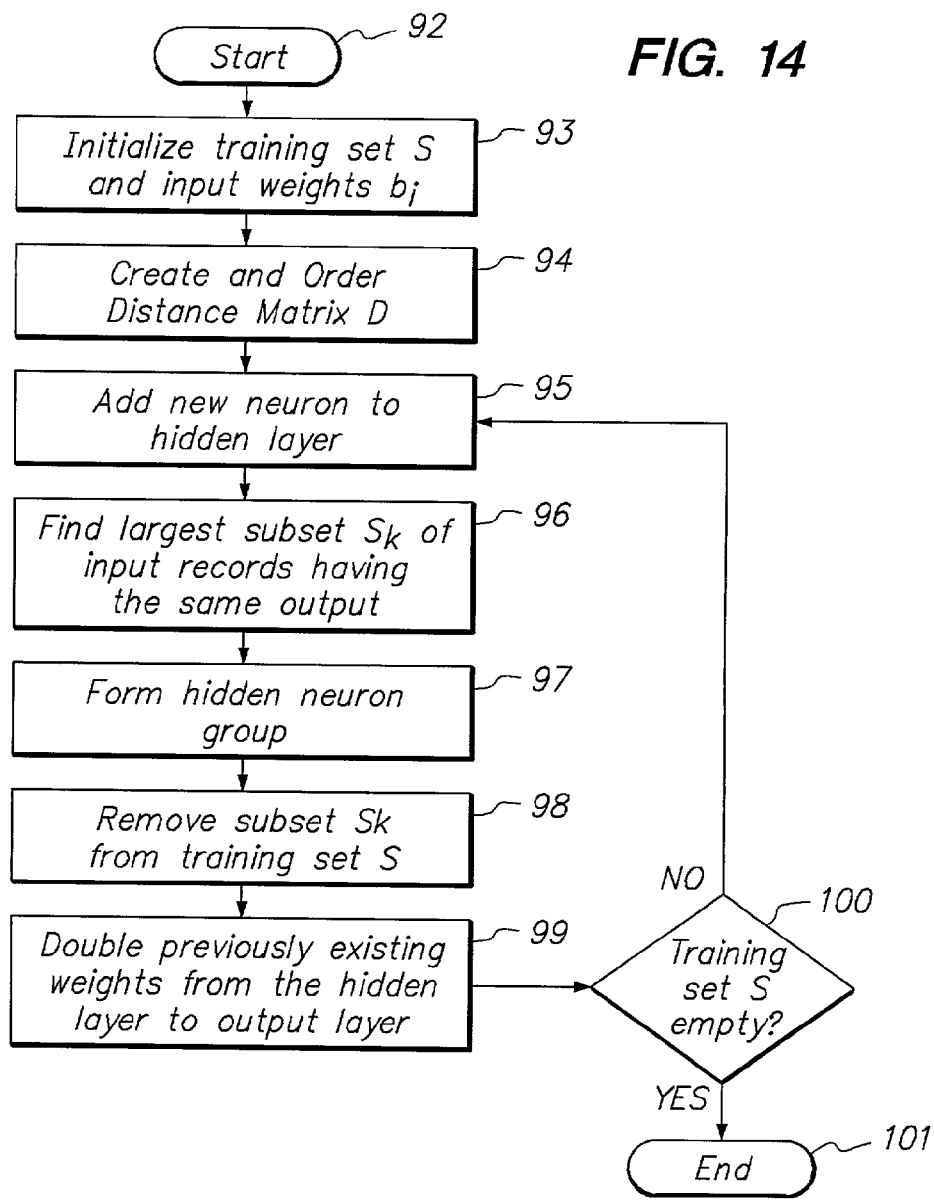
FIG. 14 is a flowchart for training the neural network.

Referring now to FIG. 14, a flowchart for training the neural network is described. The neural network used in the model contains a single hidden layer, which is build incrementally during the training process. The hidden layer may also grow later on during an update. The training process consists of computing the distance between all the records in the training tables and grouping some of the records together. At step 93, the training set S and the input weights $b_i$ are initialized. Training set S is initialized to contain all the records in the training tables. Each field i in the training tables is assigned a weight $b_i$ to indicate its importance. The input weights $b_i$ are selected by client 58. At step 94, a distance matrix D is created. Distance matrix D is a square and symmetric matrix of size N×N, where N is the total number of records in training set S. Each element $D_{i,j}$ in row i and column j of distance matrix D contains the distance between record i and record j in training set S. The distance between two records in training set S is computed using a distance measure.

Referring now to FIG. 15, an illustrative table of distance measures that can be used in the neural network training process is described. Table 102 lists distance measures 102a–e that can be used to compute the distance between two records $X_i$ and $X_j$ in training set S. The default distance measure used in the training process is Weighted-Euclidean distance measure 102e, that uses input weights $b_i$ to assign priority values to the fields in the training tables.

Referring back to FIG. 14, at step 94, distance matrix D is computed such that each element at row i and column j contains $d(X_i, X_j)$ between records $X_i$ and $X_j$ in training set S. Each row i of distance matrix D is then sorted so that it contains the distances of all the records in training set S ordered from the closest one to the farthest one.

At step 95, a new neuron is added to the hidden layer of the neural network, and at step 96, the largest subset $S_k$ of input records having the same output is determined. Once the largest subset $S_k$ is determined, the neuron group is formed at step 97. The neuron group consists of two limiting thresholds, $\Theta_{low}$ and $\Theta_{high}$, input weights $W_h$, and output weights $V_h$, such that $\Theta_{low} = D_{k,j}$ and $\Theta_{high} = D_{k,l}$, where k is the row in the sorted distance matrix D that contains the largest subset $S_k$ of input records having the same output, j is the index of the first column in the subset $S_k$ of row k, and l is the index of the last column in the subset $S_k$ of row k. The input weights $W_h$ are equal to the value of the input record in row k of the distance matrix D, and the output weights $V_h$ are equal to zero except for the weight assigned between the created neuron in the hidden layer and the neuron in the output layer representing the output class value of the records belonging to subset $S_k$. At step 98, subset $S_k$ is removed from training set S, and at step 99, all the previously existing output weights $V_h$ between the hidden layer and the output layer are doubled. Finally, at step 100, the training set is checked to see if it still contains input records, and if so, the training process goes back to step 95. Otherwise, the training process is finished and the neural network is ready for use.

Figure 16:
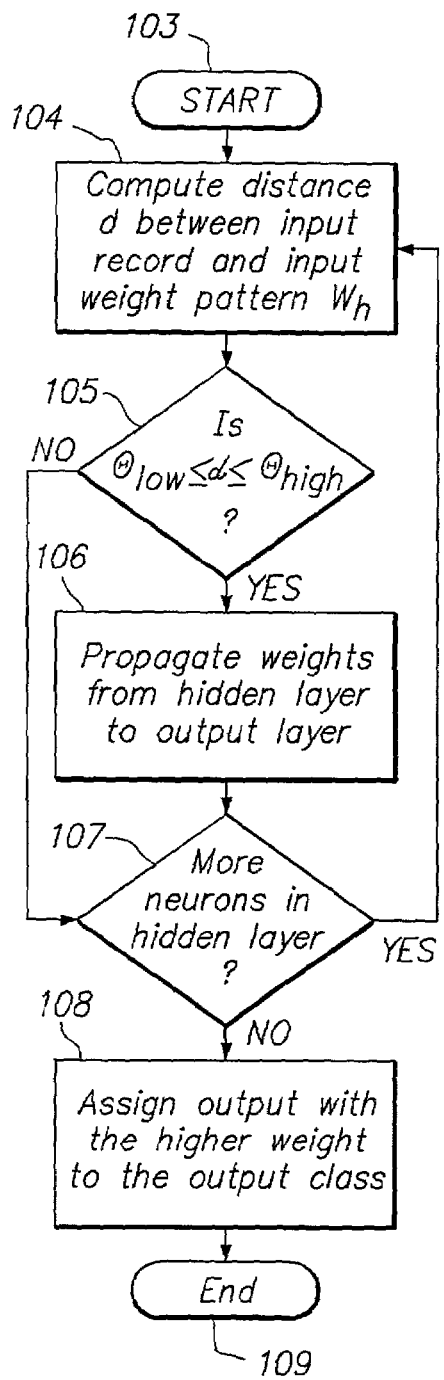
FIG. 16 is a flowchart for propagating an input record through the neural network.

Referring now to FIG. 16, a flowchart for propagating an input record through the neural network is described. An input record is propagated through the network to predict whether its output denotes a fraudulent transaction. At step 104, the distance between the input record and the weight pattern $W_h$ between the input layer and the hidden layer in the neural network is computed. At step 105, the distance d is compared to the limiting thresholds $\Theta_{low}$ and $\Theta_{high}$ of the first neuron in the hidden layer. If the distance is between the limiting thresholds, then the weights $W_h$ are added to the weights $V_h$ between the hidden layer and the output layer of the neural network at step 106. If there are more neurons in the hidden layer at step 107, then the propagation algorithm goes back to step 104 to repeat steps 104, 105, and 106 for the other neurons in the hidden layer. Finally, at step 108, the predicted output class is determined according to the neuron at the output layer that has the higher weight.

Figure 17:
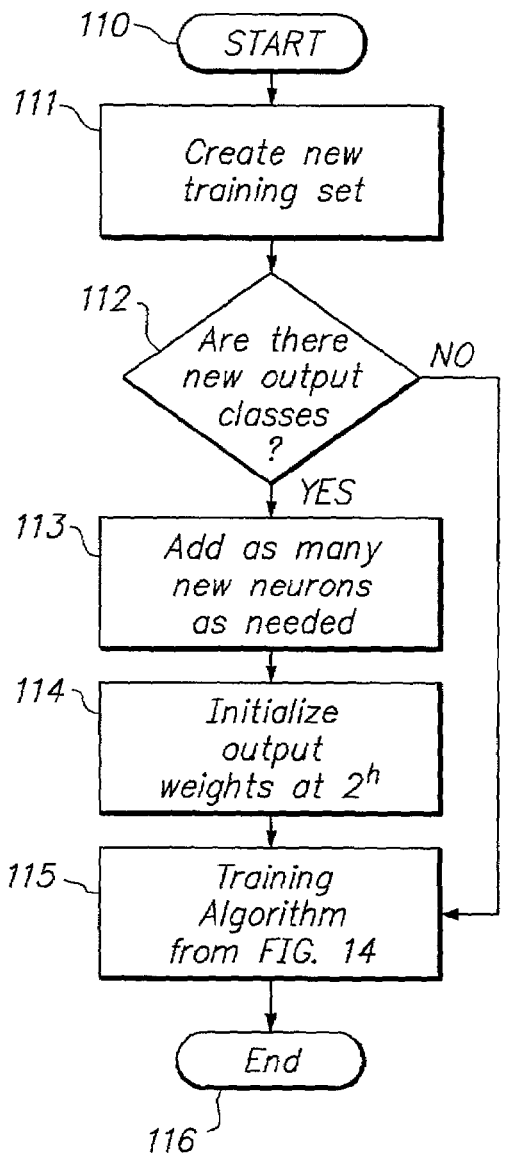
FIG. 17 is a flowchart for updating the training process of the neural network.

Referring now to FIG. 17, a flowchart for updating the training process of the neural network is described. The training process is updated whenever the neural network needs to learn some new input records. In a preferred embodiment, the neural network is updated automatically, as soon as data from a new business transaction is evaluated by the model. Alternatively, the neural network may be updated offline.

At step 111, a new training set for updating the neural network is created. The new training set contains all the new data records that were not utilized when first training the network using the training algorithm illustrated in FIG. 14. At step 112, the training set is checked to see if it contains any new output classes not found in the neural network. If there are no new output classes, the updating process proceeds at step 115 with the training algorithm illustrated in FIG. 14. If there are new output classes, then new neurons are added to the output layer of the neural network at step 113, so that each new output class has a corresponding neuron at the output layer. When the new neurons are added, the weights from these neurons to the existing neurons at the hidden layer of the neural network are initialized to zero. At step 114, the weights from the hidden neurons to be created during the training algorithm at step 115 are initialized as $2^h$, where h is the number of hidden neurons in the neural network prior to the insertion of each new hidden neuron. With this initialization, the training algorithm illustrated in FIG. 14 is started at step 115 to form the updated neural network sub-model.

It will be understood by one skilled in the art that evaluating whether a given input record is fraudulent or not can be done quickly and reliably with the training, propagation, and updating algorithms described.

Multi-Agent Sub-Model

The multi-agent sub-model involves multiple agents that learn in unsupervised mode how to detect and prevent electronic fraud and network intrusion. Each field in the training tables has its own agent, which cooperate with each order in order to combine some partial pieces of knowledge they find about the data for a given field and validate the data being examined by another agent. The agents can identify unusual data and unexplained relationships. For example, by analyzing a healthcare database, the agents would be able to identify unusual medical treatment combinations used to combat a certain disease, or to identify that a certain disease is only linked to children. The agents would also be able to detect certain treatment combinations just by analyzing the database records with fields such as symptoms, geographic information of patients, medical procedures, and so on.

The multi-agent sub-model has then two goals: (1) creating intervals of normal values for each one of the fields in the training tables to evaluate whether the values of the fields of a given electronic transaction are normal; and (2) determining the dependencies between each field in the training tables to evaluate whether the values of the fields of a given electronic transaction are coherent with the known field dependencies. Both goals generate warnings whenever an electronic transaction is suspect of being fraudulent.

Figure 18:
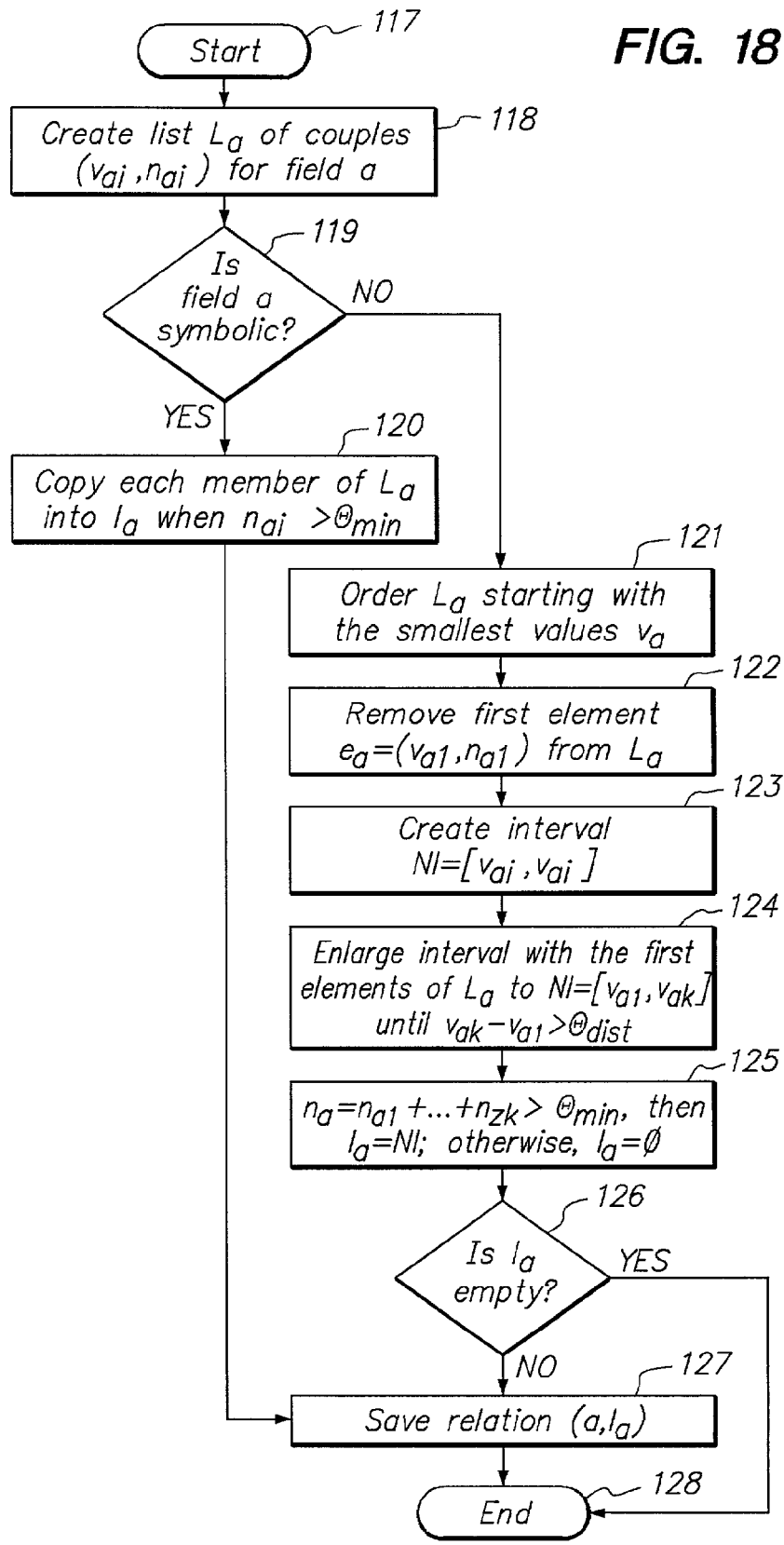
FIG. 18 is a flowchart for creating intervals of normal values for a field in the training tables.

Referring now to FIG. 18, a flowchart for creating intervals of normal values for a field in the training tables is described. The algorithm illustrated in the flowchart is run for each field a in the training tables. At step 118, a list $L_a$ of distinct couples $(v_{ai}, n_{ai})$ is created, where $v_{ai}$ represents the $i^{th}$ distinct value for field a and $n_{ai}$ represents its cardinality, i.e., the number of times value $v_{ai}$ appears in the training tables. At step 119, the field is determined to be symbolic or numeric. If the field is symbolic, then at step 120, each member of $L_a$ is copied into a new list $I_a$ whenever $n_{ai}$ is superior to a threshold $\Theta_{min}$ that represents the minimum number of elements a normal interval must include. $\Theta_{min}$ is computed as $\Theta_{min} = f_{min} * M$, where M is the total number of records in the training tables and $f_{min}$ is a parameter specified by the user representing the minimum frequency of values in each normal interval. Finally, at step 127, the relations $(a, I_a)$ are saved. Whenever a data record is to be evaluated by the multi-agent sub-model, the value of the field a in the data record is compared to the normal intervals created in $I_a$ to determine whether the value of the field a is outside the normal range of values for that given field.

If the field a is determined to be numeric at step 119, then at step 121, the list $L_a$ of distinct couples $(v_{ai}, n_{ai})$ is ordered starting with the smallest value $V_a$. At step 122, the first element $e=(v_{a1}, n_{a1})$ is removed from the list $L_a$, and at step 123, an interval $NI=[v_{a1}, v_{a1}]$ is formed. At step 124, the interval NI is enlarged to $NI=[V_{a1}, v_{ak}]$ until $V_{ak} - V_{a1} > \Theta_{dist}$, where $\Theta_{dist}$ represents the maximum width of a normal interval. $\Theta_{dist}$ is computed as $\Theta_{dist} = (max_a - min_a)/n_{max}$, where $n_{max}$ is a parameter specified by the user to denote the maximum number of intervals for each field in the training tables. Step 124 is performed so that values that are too disparate are not grouped together in the same interval.

At step 125, the total cardinality $n_a$ of all the values from $v_{a1}$ to $v_{ak}$ is compared to $\Theta_{min}$ to determine the final value of the list of normal intervals $I_a$. If the list $I_a$ is not empty (step 126), the relations $(a, I_a)$ are saved at step 127. Whenever a data record is to be evaluated by the multi-agent sub-model, the value of the field a in the data record is compared to the normal intervals created in $I_a$ to determine whether the value of the field a is outside the normal range of values for that given field. If the value of the field a is outside the normal range of values for that given field, a warning is generated to indicate that the data record is likely fraudulent.

Figures 19, 20:
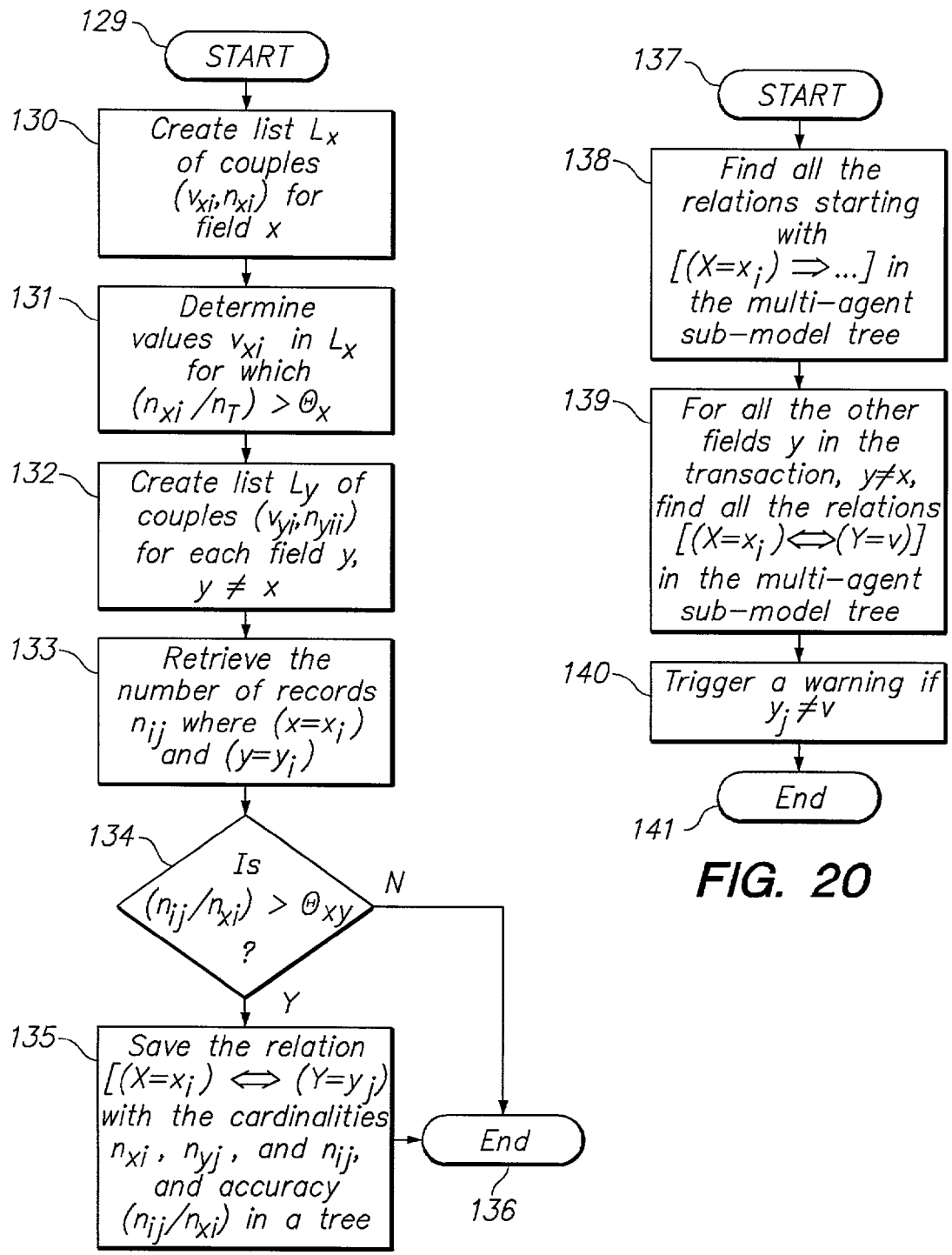
FIG. 19 is a flowchart for determining the dependencies between each field in the training tables.
FIG. 20 is a flowchart for verifying the dependencies between the fields in an input record.

Referring now to FIG. 19, a flowchart for determining the dependencies between each field in the training tables is described. At step 130, a list Lx of couples $(v_{xi}, n_{xi})$ is created for each field x in the training tables. At step 131, the values $v_{xi}$ in $L_x$ for which $(n_{xi}/n_T) > \Theta_x$ are determined, where $n_T$ is the total number of records in the training tables and $\Theta_x$ is a threshold value specified by the user. In a preferred embodiment, $\Theta_x$ has a default value of 1%. At step 132, a list $L_y$ of couples $(v_{yi}, n_{yi})$ for each field y, $Y \neq X$, is created. At step 133, the number of records $n_{ij}$ where $(x=x_i)$ and $(y=y_j)$ are retrieved from the training tables. If the relation is significant at step 134, that is, if $(n_{ij}/n_{xi}) > \Theta_{xy}$, where $\Theta_{xy}$ is a threshold value specified by the user when the relation $(X=x_i) \Leftrightarrow (Y=y_j)$ is saved at step 135 with the cardinalities $n_{xi}$, $n_{yj}$, and $n_{ij}$, and accuracy $(n_{ij}/n_{xi})$. In a preferred embodiment, $\Theta_{xy}$ has a default value of 85%.

All the relations are saved in a tree made with four levels of hash tables to increase the speed of the multi-agent sub-model. The first level in the tree hashes the field name of the first field, the second level hashes the values for the first field implying some correlations with other fields, the third level hashes the field name with whom the first field has some correlations, and finally, the fourth level in the tree hashes the values of the second field that are correlated with the values of the first field. Each leaf of the tree represents a relation, and at each leaf, the cardinalities $n_{xi}$, $n_{yj}$, and $n_{ij}$ are stored. This allows the multi-agent sub-model to be automatically updated and to determine the accuracy, prevalence, and the expected predictability of any given relation formed in the training tables.

Referring now to FIG. 20, a flowchart for verifying the dependencies between the fields in an input record is described. At step 138, for each field x in the input record corresponding to an electronic transaction, the relations starting with $[(X=x_i) \Leftrightarrow \ldots ]$ are found in the multi-agent sub-model tree. At step 139, for all the other fields y in the transaction, the relations $[(X=x_i) \Leftrightarrow (Y=v)]$ are found in the tree. At step 140, a warning is triggered anytime $Y_j \neq V$. The warning indicates that the values of the fields in the input record are not coherent with the known field dependencies, which is often a characteristic of fraudulent transactions.

Figure 21:
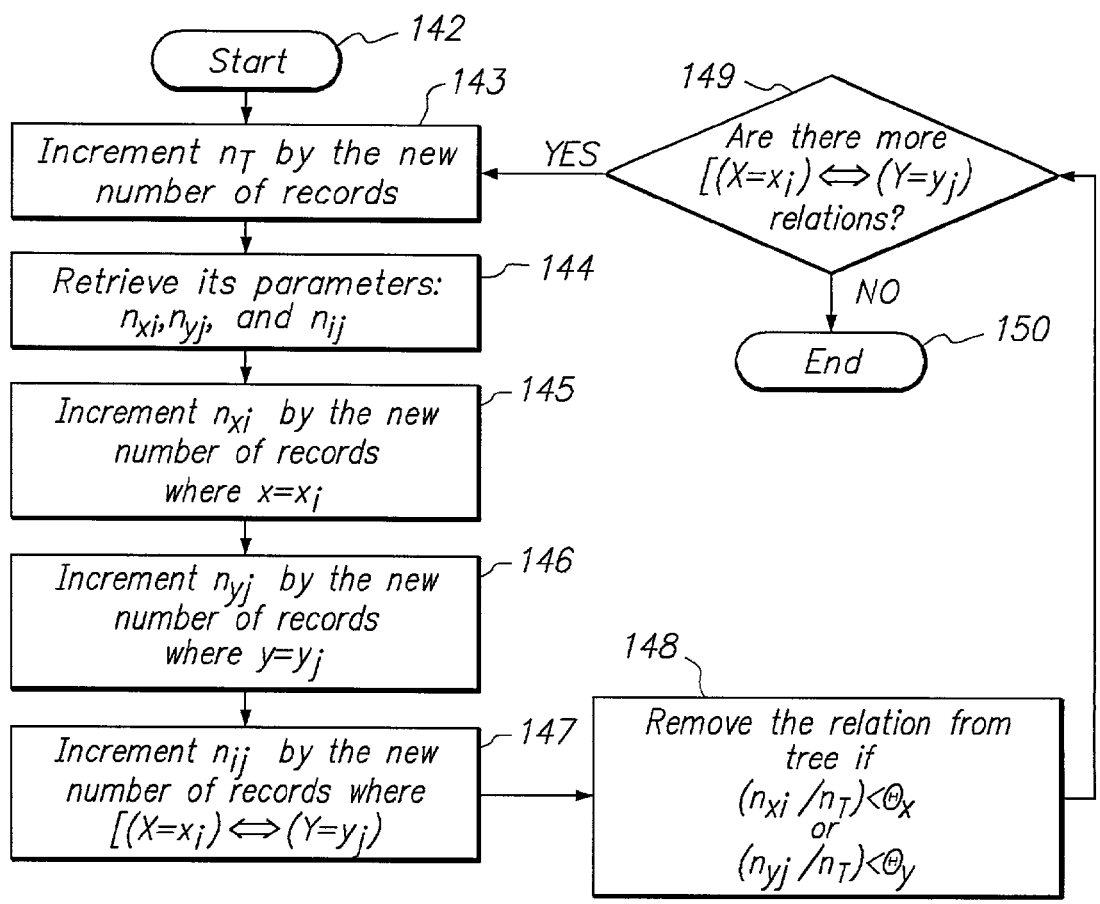
FIG. 21 is a flowchart for updating the multi-agent sub-model.

Referring now to FIG. 21, a flowchart for updating the multi-agent sub-model is described. At step 143, the total number of records $n_T$ in the training tables is incremented by the new number of input records to be included in the update of the multi-agent sub-model. For the first relation $(X=x_i) \Leftrightarrow (Y=y_j)$ previously created in the sub-model, the parameters $n_{xi}$, $n_{yj}$, and $n_{ij}$ are retrieved at step 144. At steps 145, 146, and 147, $n_{xi}$, $n_{yj}$, and $n_{ij}$ are respectively incremented. At step 148, the relation is verified to see if it is still significant for including it in the multi-agent sub-model tree. If the relation is not significant, then it is removed from the tree. Finally, at step 149, a check is performed to see if there are more previously created relations $(X=x_i) \Leftrightarrow (Y=y_j)]$ in the sub-model. If there are, then the algorithm goes back to step 143 and iterates until there are no more relations in the tree to be updated.

Data Mining Sub-Model

The goal of the data mining sub-model is to create a decision tree based on the records in the training database to facilitate and speed up the case-based reasoning sub-model. The case-based reasoning sub-model determines if a given input record associated with an electronic transaction is similar to any typical records encountered in the training tables. Each record is referred to as a "case". If no similar cases are found, a warning is issued to indicate that the input record is likely fraudulent. The data mining sub-model creates the decision tree as an indexing mechanism for the case-based reasoning sub-model. Additionally, the data mining sub-model can be used to automatically create and maintain business rules for the rule-based reasoning sub-model.

The decision tree is a n-ary tree, wherein each node contains a subset of similar records in the training database. In a preferred embodiment, the decision tree is a binary tree. Each subset is split into two other subsets, based on the result of an intersection between the set of records in the subset and a test on a field. For symbolic fields, the test is whether the values of the fields in the records in the subset are equal, and for numeric fields, the test is whether the values of the fields in the records in the subset are smaller than a given value. Applying the test on a subset splits the subset in two others, depending on whether they satisfy the test or not. The newly created subsets become the children of the subset they originated from in the tree. The data mining sub-model creates the subsets recursively until each subset that is a terminal node in the tree represents a unique output class.

Figure 22:
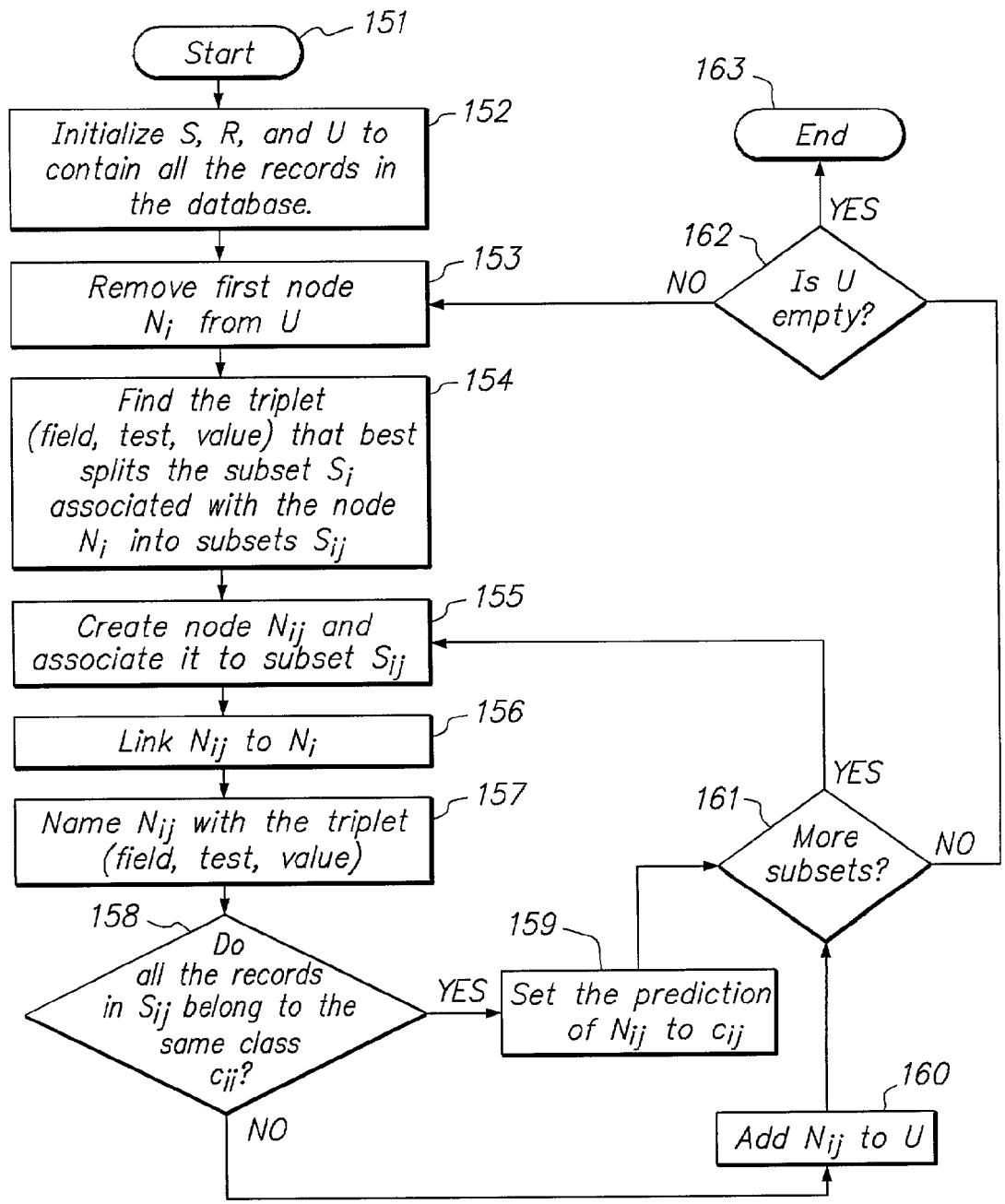
FIG. 22 is a flowchart for generating the data mining sub-model to create a decision tree based on similar records in the training tables.

Referring now to FIG. 22, a flowchart for generating the data mining sub-model to create a decision tree based on similar records in the training tables is described. At step 152, sets S, R, and U are initialized. Set S is a set that contains all the records in the training tables, set R is the root of the decision tree, and set U is the set of nodes in the tree that are not terminal nodes. Both R and U are initialized to contain all the records in the training tables. Next, at step 153, the first node $N_i$ (containing all the records in the training database) is removed from U. At step 154, the triplet (field,test,value) that best splits the subset $S_i$ associated with the node $N_i$ into two subsets is determined. The triplet that best splits the subset $S_i$ is the one that creates the smallest depth tree possible, that is, the triplet would either create one or two terminal nodes, or create two nodes that, when split, would result in a lower number of children nodes than other triplets. The triplet is determined by using an impurity function such as Entropy or the Gini index to find the information conveyed by each field value in the database. The field value that conveys the least degree of information contains the least uncertainty and determines the triplet to be used for splitting the subsets.

At step 155, a node $N_{ij}$ is created and associated to the first subset $S_{ij}$ formed at step 154. The node $N_{ij}$ is then linked to node $N_i$ at step 156, and named with the triplet (field,test, value) at step 157. Next, at step 158, a check is performed to evaluate whether all the records in subset $S_{ij}$ at node $N_{ij}$ belong to the same output class $c_{ij}$. If they do, then the prediction of node $N_{ij}$ is set to $c_{ij}$ at step 159. If not, then node $N_{ij}$ is added to U at step 160. The algorithm then proceeds to step 161 to check whether there are still subsets $S_{ij}$ to be split in the tree, and if so, the algorithm goes back to step 155. When all subsets have been associated with nodes, the algorithm continues at step 153 for the remaining nodes in U until U is determined to be empty at step 162.

Figure 23:
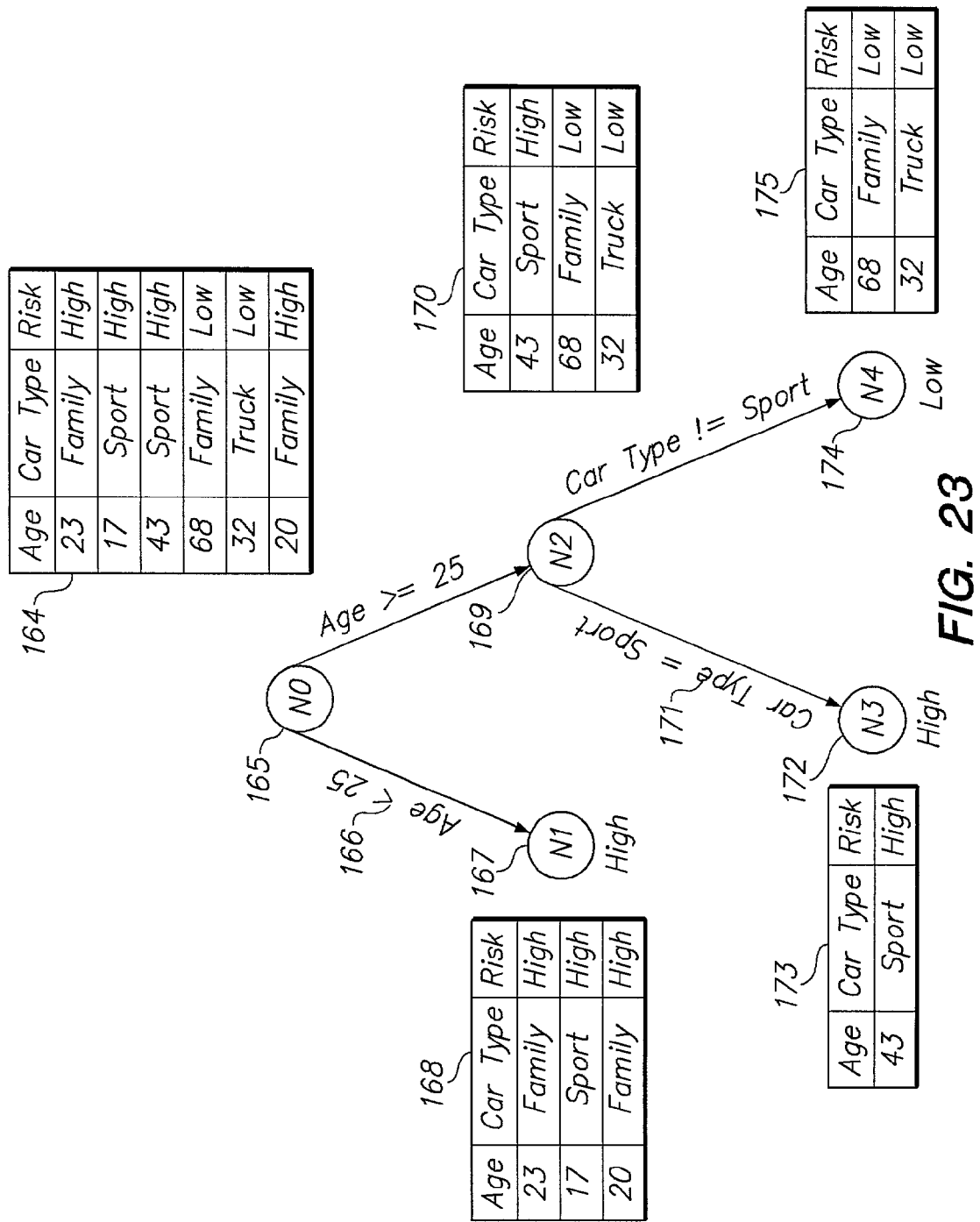
FIG. 23 is an illustrative decision tree for a database maintained by an insurance company to predict the risk of an insurance contract based on the type of the car and the age of its driver.

Referring now to FIG. 23, an illustrative decision tree for a database maintained by an insurance company to predict the risk of an insurance contract based on the type of the car and the age of its driver is described. Database 164 contains three fields: (1) age; (2) car type; and (3) risk. The risk field is the output class that needs to be predicted for any new incoming data record. The age and the car type fields are used as inputs. The data mining sub-model builds a decision tree that facilitates the search of cases for the case-based reasoning sub-model to determine whether an incoming transaction fits the profile of similar cases encountered in the database. The decision tree starts with root node N0 (165). Upon analyzing the data records in database 164, the data mining sub-model finds test 166 that best splits database 164 into two nodes, node N1 (167) containing subset 168, and node N2 (169) containing subset 170. Node N1 (167) is a terminal node, since all the data records in subset 168 have the same class output that denotes a high insurance risk for drivers younger than 25 years of age.

The data mining sub-model then proceeds to split node N2 (169) into two additional nodes, node N3 (172) containing subset 173, and node N4 (174) containing subset 175. Both nodes N3 (172) and N4 (174) were split from node N2 (169) based on test 171, that checks whether the car type is a sports car. As a result, nodes N3 (172) and N4 (174) are terminal nodes, with node N3 (172) denoting a high risk of insurance and node N4 (174) denoting a low risk of insurance.

The decision tree formed by the data mining sub-model is preferably a depth two binary tree, significantly reducing the size of the search problem for the case-based reasoning sub-model. Instead of searching for similar cases to an incoming data record associated with an electronic transaction in the entire database, the case-based reasoning sub-model only has to use the predefined index specified by the decision tree.

Case-Based Reasoning Sub-Model

The case-based reasoning sub-model involves an approach of reasoning by analogy and classification that uses stored past data records or cases to identify and classify a new case. The case-based reasoning sub-model creates a list of typical cases that best represent all the cases in the training tables. The typical cases are generated by computing the similarity between all the cases in the training tables and selecting the cases that best represent the distinct cases in the tables. Whenever a new electronic transaction is conducted, the case-based reasoning sub-model uses the decision tree created by the data mining sub-model to determine if a given input record associated with an electronic transaction is similar to any typical cases encountered in the training tables.

Figure 24:
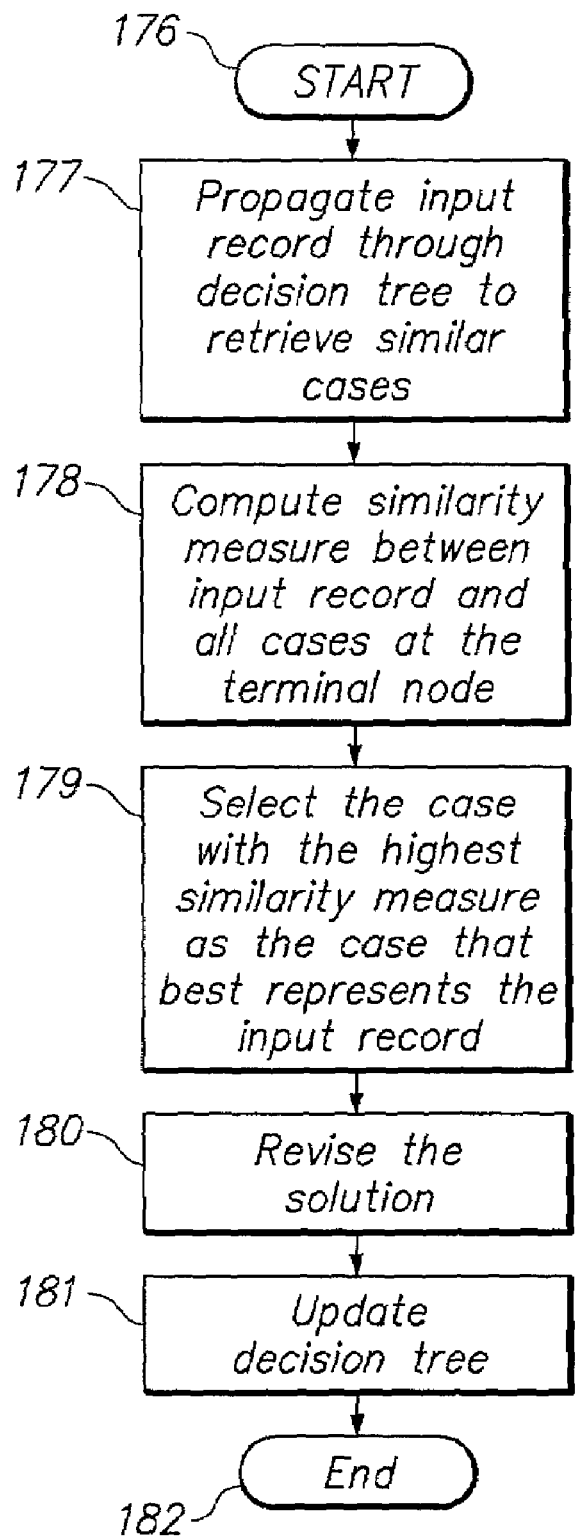
FIG. 24 is a flowchart for generating the case-based reasoning sub-model to find the case in the database that best resembles a new transaction.

Referring to FIG. 24, a flowchart for generating the case-based reasoning sub-model to find the record in the database that best resembles the input record corresponding to a new transaction is described. At step 177, the input record is propagated through the decision tree according to the tests defined for each node in the tree until it reaches a terminal node. If the input record is not fully defined, that is, the input record does not contain values assigned to certain fields, then the input record is propagated to the last node in the tree that satisfies all the tests. The cases retrieved from this node are all the cases belonging to the node's leaves.

At step 178, a similarity measure is computed between the input record and each one of the cases retrieved at step 177. The similarity measure returns a value that indicates how close the input record is to a given case retrieved at step 177. The case with the highest similarity measure is then selected at step 179 as the case that best represents the input record. At step 180, the solution is revised by using a function specified by the user to modify any weights assigned to fields in the database. Finally, at step 181, the input record is included in the training database and the decision tree is updated for learning new patterns.

Referring now to FIG. 25, an illustrative table of global similarity measures used by the case-based reasoning sub-model is described. Table 183 lists six similarity measures that can be used by the case-based reasoning sub-model to compute the similarity between cases. The global similarity measures compute the similarity between case values $V_{1i}$ and $V_{2i}$ and are based on local similarity measures $sim_i$ for each field $y_i$. The global similarity measures may also employ weights $w_i$ for different fields.

Referring now to FIG. 26, an illustrative table of local similarity measures used by the case-based reasoning sub-model is described. Table 184 lists fourteen different local similarity measures that can be used by the global similarity measures listed in table 183. The local similarity measures depend on the field type and valuation. The field type can be either: (1) symbolic or nominal; (2) ordinal, when the values are ordered; (3) taxonomic, when the values follow a hierarchy; and (4) numeric, which can take discrete or continuous values. The local similarity measures are based on a number of parameters, including: (1) the values of a given field for two cases, $V_1$ and $V_2$; (2) the lower ($V_1^-$ and $V_2^-$) and higher ($V_1^+$ and $V_2^+$) limits of $V_1$ and $V_2$; (3) the set O of all values that can be reached by the field; (4) the central points of $V_1$ and $V_2$, $V_{1c}$ and $V_{2c}$; (5) the absolute value ec of a given interval; and (6) the height h of a level in a taxonomic descriptor.

Genetic Algorithms Sub-Model

The genetic algorithms sub-model involves a library of genetic algorithms that use ideas of biological evolution to determine whether a business transaction is fraudulent or whether there is network intrusion. The genetic algorithms are able to analyze the multiple data records and predictions generated by the other sub-models and recommend efficient strategies for quickly reaching a decision.

Rule-Based Reasoning, Fuzzy Logic, and Constraint Programming Sub-Models

The rule-based reasoning, fuzzy logic, and constraint programming sub-models involve the use of business rules, constraints, and fuzzy rules to determine whether a current data record associated with an electronic transaction is fraudulent. The business rules, constraints, and fuzzy rules are derived from past data records in the training database or created from potentially unusual data records that may arise in the future. The business rules can be automatically created by the data mining sub-model, or they can be specified by the user. The fuzzy rules are derived from the business rules, while the constraints are specified by the user. The constraints specify which combinations of values for fields in the database are allowed and which are not.

Figure 27:
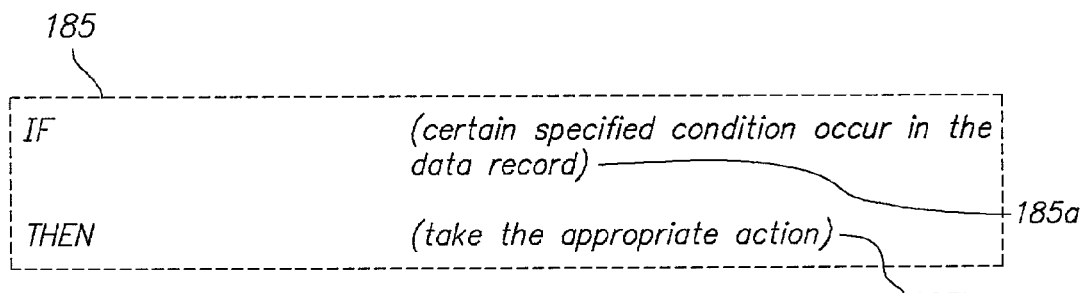
FIG. 27 is an illustrative rule for use with the rule-based reasoning sub-model.

Referring now to FIG. 27, an illustrative rule for use with the rule-based reasoning sub-model is described. Rule 185 is an IF-THEN rule containing antecedent 185a and consequent 185b. Antecedent 185a consists of tests or conditions to be made on data records to be analyzed for fraud. Consequent 185b holds actions to be taken if the data pass the tests in antecedent 185a. An example of rule 185 to determine whether a credit card transaction is fraudulent for a credit card belonging to a single user may include "IF (credit card user makes a purchase at 8 am in New York City) and (credit card user makes a purchase at 8 am in Atlanta) THEN (credit card number may have been stolen)". The use of the words "may have been" in the consequent sets a trigger that other rules need to be checked to determine whether the credit card transaction is indeed fraudulent or not.

Figure 28:
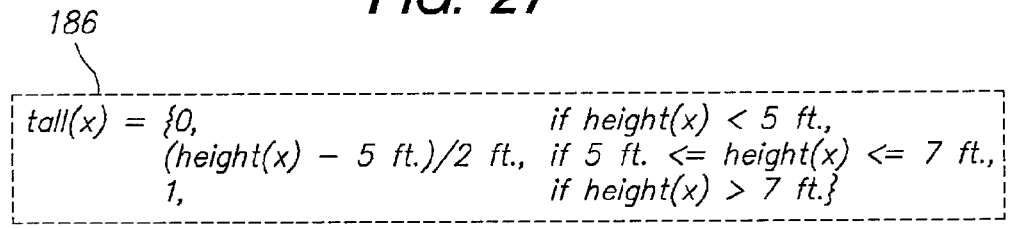
FIG. 28 is an illustrative fuzzy rule to specify whether a person is tall.

Referring now to FIG. 28, an illustrative fuzzy rule to specify whether a person is tall is described. Fuzzy rule 186 uses fuzzy logic to handle the concept of partial truth, i.e., truth values between "completely true" and "completely false" for a person who may or may not be considered tall. Fuzzy rule 186 contains a middle ground in addition to the boolean logic that classifies information into binary patterns such as yes/no. Fuzzy rule 186 has been derived from an example rule 185 such as "IF height >6 ft, THEN person is tall". Fuzzy logic derives fuzzy rule 186 by "fuzzification" of the antecedent and "defuzzificsation" of the consequent of business rules such as example rule 185.

Figure 29:
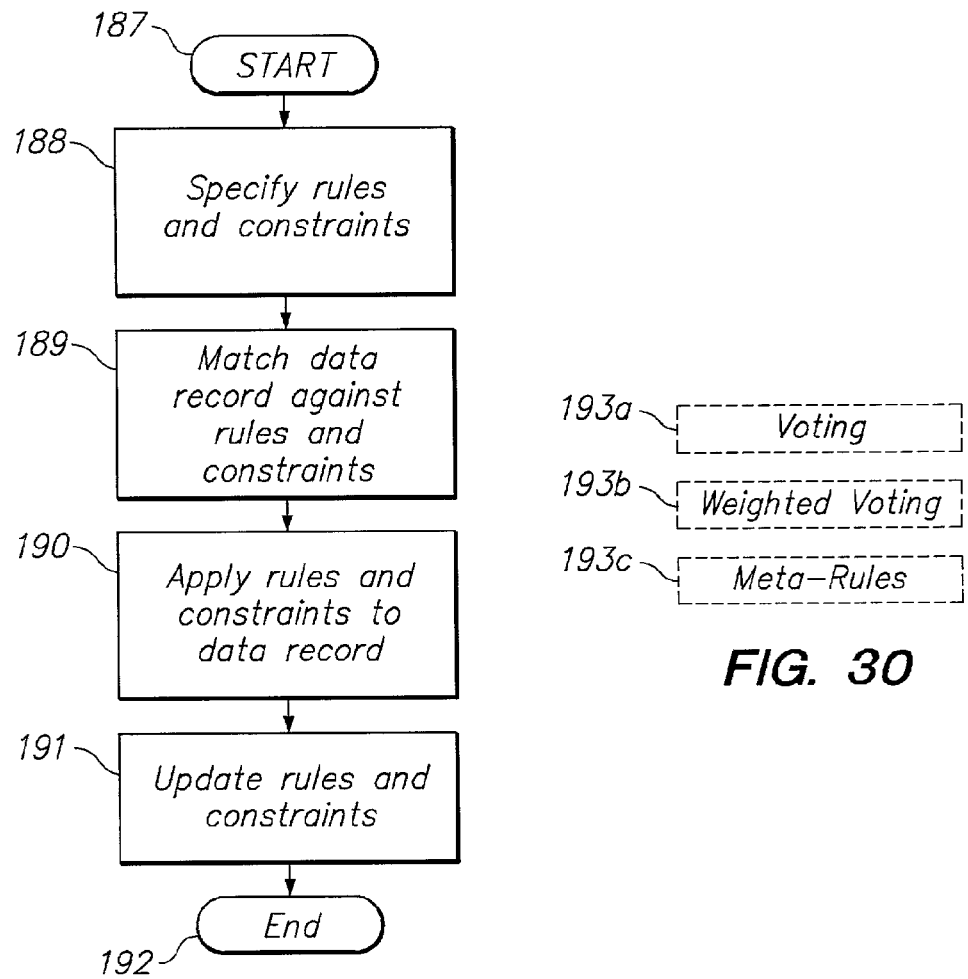
FIG. 29 is a flowchart for applying rule-based reasoning, fuzzy logic, and constraint programming to determine whether an electronic transaction is fraudulent.

Referring now to FIG. 29, a flowchart for applying rule-based reasoning, fuzzy logic, and constraint programming to determine whether an electronic transaction is fraudulent is described. At step 188, the rules and constraints are specified by the user and/or derived by data mining sub-model 83c. At step 189, the data record associated with a current electronic transaction is matched against the rules and the constraints to determine which rules and constraints apply to the data. At step 190, the data is tested against the rules and constraints to determine whether the transaction is fraudulent. Finally, at step 191, the rules and constraints are updated to reflect the new electronic transaction.

Combining the Sub-Models

In a preferred embodiment, the neural network sub-model, the multi-agent sub-model, the data mining sub-model, and the case-based reasoning sub-model are all used together to come up with the final decision on whether an electronic transaction is fraudulent or on whether there is network intrusion. The fraud detection model uses the results given by the sub-models and determines the likelihood of a business transaction being fraudulent or the likelihood that there is network intrusion. The final decision is made depending on the client's selection of which sub-models to rely on.

The client's selection of which sub-models to rely on is made prior to training the sub-models through model training interface 51 (FIG. 1). The default selection is to include the results of the neural network sub-model, the multi-agent sub-model, the data mining sub-model, and the case-based reasoning sub-model. Alternatively, the client may decide to use any combination of sub-models, or to select an expert mode containing four additional sub-models: (1) rule-based reasoning sub-model 84a; (2) fuzzy logic sub-model 84b; (3) genetic algorithms sub-model 84c; and (4) constraint programming sub-model 84d (FIG. 11).

Figure 30:
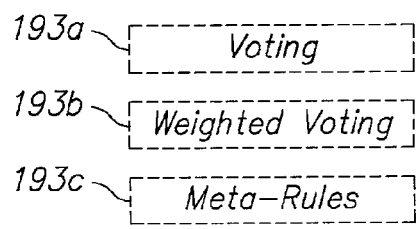
FIG. 30 is a schematic view of exemplary strategies for combining the decisions of different sub-models to form the final decision on whether an electronic transaction is fraudulent or whether there is network intrusion.

Referring now to FIG. 30, a schematic view of exemplary strategies for combining the decisions of different sub-models to form the final decision on whether an electronic transaction is fraudulent or whether there is network intrusion. Strategy 193a lets the client assign one vote to each sub-model used in the model. The model makes its final decision based on the majority decision reached by the sub-models. Strategy 193b lets the client assign priority values to each one of the sub-models so that if one sub-model with a higher priority determines that the transaction is fraudulent and another sub-model with a lower priority determines that the transaction is not fraudulent, then the model uses the priority values to discriminate between the results of the two sub-models and determine that the transaction is indeed fraudulent. Lastly, strategy 193c lets the client specify a set of meta-rules to choose a final outcome.

III. Querying Model Component

Figure 31:
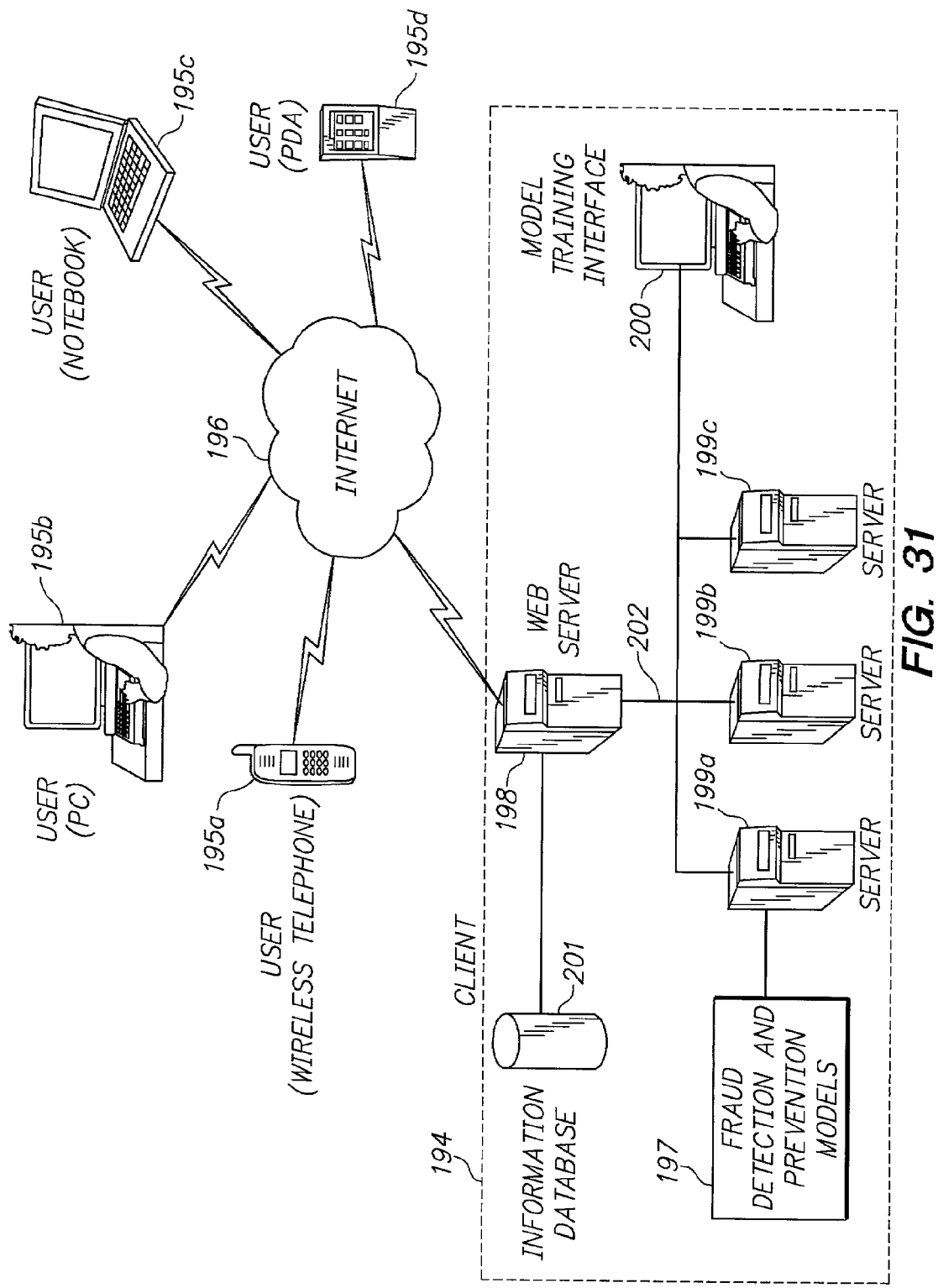
FIG. 31 is a schematic view of querying a model for detecting and preventing fraud in web-based electronic transactions.

Referring now to FIG. 31, a schematic view of querying a model for detecting and preventing fraud in web-based electronic transactions is described. Client 194 provides a web site to users 195a–d by means of Internet 196 through which electronic transactions are conducted. Users 195a–d connect to the Internet using a variety of devices, including personal computer 195a, notebook computer 195b, personal digital assistant (PDA) 195c, and wireless telephone 195d. When users 195a–d engage in electronic transactions with client 194, data usually representing sensitive information is transmitted to client 194. Client 194 relies on this information to process the electronic transactions, which may or may not be fraudulent. To detect and prevent fraud, client 194 runs fraud detection and prevention models 197 on one of its servers 198, and 199a–c. Models 197 are configured by means of model training interface 200 installed at one of the computers belonging to client 194. Each one of models 197 may be configured for a different type of transaction.

Web server 198 executes web server software to process requests and data transfers from users 195a–d connected to Internet 196. Web server 198 also maintains information database 201 that stores data transmitted by users 195a–d during electronic transactions. Web server 198 may also handle database management tasks, as well as a variety of administrative tasks, such as compiling usage statistics. Alternatively, some or all of these tasks may be performed by servers 199a–c, connected to web server 198 through local area network 202. Local area network 202 also connects to a computer running model training interface 200 that uses the data stored in information database 201 to train models 197.

When one of users 195a–d sends data through an electronic transaction to client 194, the data is formatted at web server 198 and sent to the server running models 197 as an HTTP string. The HTTP string contains the path of the model among models 197 to be used for determining whether the transaction is fraudulent as well as all the couples (field,value) that need to be processed by the model. The model automatically responds with a predicted output, which may then be used by web server 198 to accept or reject the transaction depending on whether the transaction is fraudulent or not. It should be understood by one skilled in the art that models 197 may be updated automatically or offline.

Figure 32:
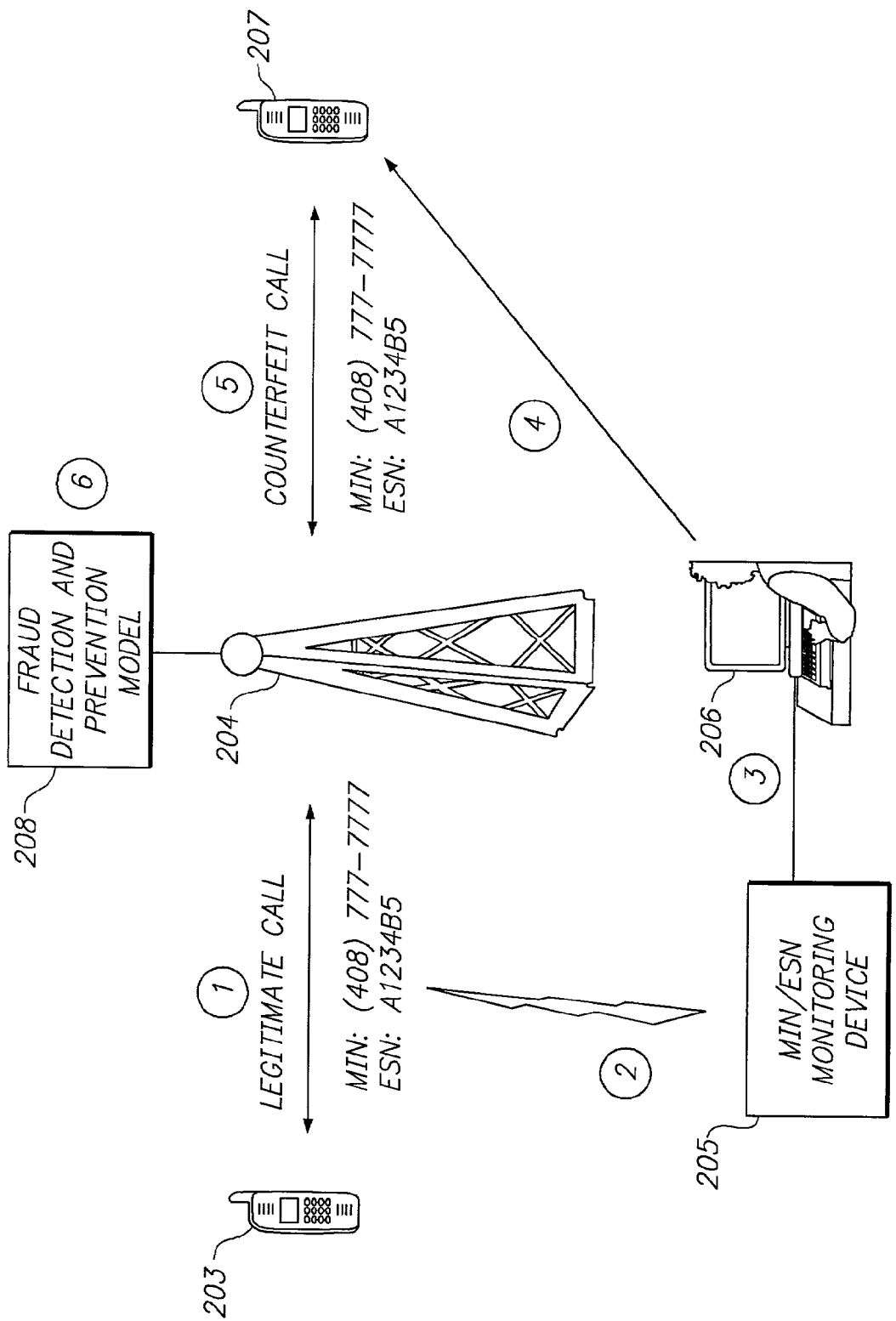
FIG. 32 is a schematic view of querying a model for detecting and preventing cellular phone fraud in a wireless network.

Referring now to FIG. 32, a schematic view of querying a model for detecting and preventing cellular phone fraud in a wireless network is described. Cellular phone 203 places a legitimate call on a wireless network through base station 204. With each call made, cellular phone 203 transmits a Mobile Identification Number (MIN) and its associated Equipment Serial Number (ESN). MIN/ESN pairs are normally broadcast from an active user's cellular phone so that it may legitimately communicate with the wireless network. Possession of these numbers is the key to cellular phone fraud.

With MIN/ESN monitoring device 205, a thief intercepts the MIN/ESN codes of cellular phone 203. Using personal computer 206, the thief reprograms other cellular phones such as cellular phone 207 to carry the stolen MIN/ESN numbers. When this reprogramming occurs, all calls made from cellular phone 207 appear to be made from cellular phone 203, and the original customer of cellular phone 203 gets charged for the phone calls made with cellular phone 207. The wireless network is tricked into thinking that cellular phone 203 and cellular phone 207 are the same device and owned by the same customer since they transmit the same MIN/ESN pair every time a call is made.

To detect and prevent cellular phone fraud, base station 204 runs fraud detection and prevention model 208. Using the intelligent technologies of model 208, base station 204 is able to determine that cellular phone 207 is placing counterfeit phone calls on the wireless networks. Model 208 uses historical data on phone calls made with cellular phone 203 to determine that cellular phone 207 is following abnormal behaviors typical of fraudulent phones. Upon identifying that the phone calls made with cellular phone 207 are counterfeit, base station 204 has several options, including interrupting phone calls from cellular phone 207 and disconnecting the MIN/ESN pair from its network, thereby assigning another MIN/ESN pair to legit cellular phone 203, and notifying the legal authorities of cellular phone 207 location so that the thief can be properly indicted.

Figure 33:
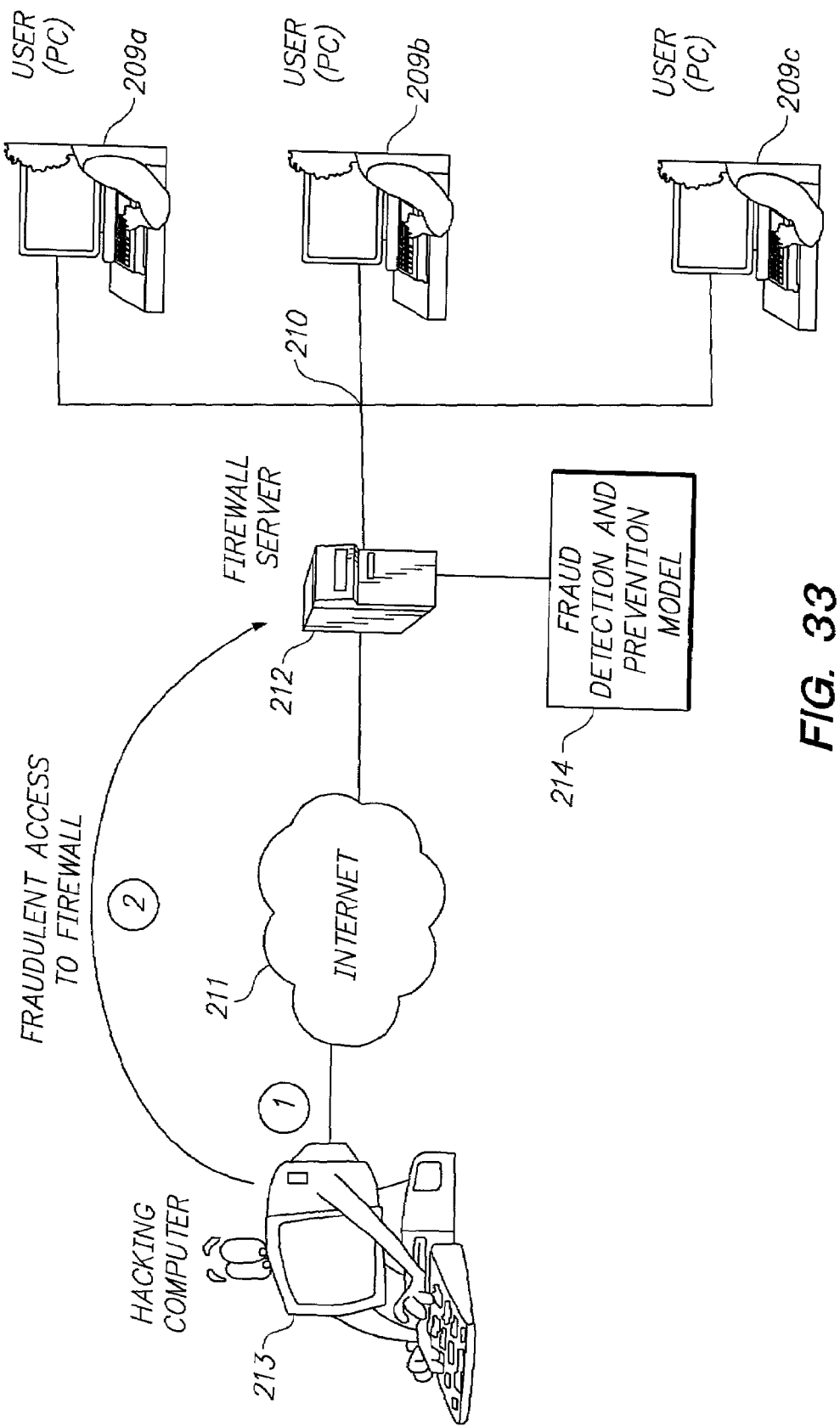
FIG. 33 is a schematic view of querying a model for detecting and preventing network intrusion.

Referring now to FIG. 33, a schematic view of querying a model for detecting and preventing network intrusion is described. Computers 209a–c are interconnected through local area network (LAN) 210. LAN 210 accesses Internet 211 by means of firewall server 212. Firewall server 212 is designed to prevent unauthorized access to or from LAN 210. All messages entering or leaving LAN 210 pass through firewall server 212, which examines each message and blocks those that do not meet a specified security criteria. Firewall server 212 may block fraudulent messages using a number of techniques, including packet filtering, application and circuit-level gateways, as well as proxy servers.

To illegally gain access to LAN 210 or computers 209a–c, hacking computer 213 uses hacking software and/or hardware such as port scanners, crackers, sniffers, and trojan horses. Port scanners enable hacking computer 213 to break the TCP/IP connection of firewall server 212 and computers 209a–c, crackers and sniffers enable hacking computer 213 to determine the passwords used by firewall server 212, and trojan horses enable hacking computer 213 to install fraudulent programs in firewall server 212 by usually disguising them as executable files that are sent as attachment e-mails to users of computers 209a–c.

To detect and prevent network intrusion, firewall server 212 runs fraud detection and prevention model 214. Model 214 uses historical data on the usage patterns of computers in LAN 210 to identify abnormal behaviors associated with hacking computers such as hacking computer 213. Model 214 enables firewall server 212 to identify that the host address of hacking computer 213 is not one of the address used by computers in LAN 210. Firewall server 212 may then interrupt all messages from and to hacking computer 213 upon identifying it as fraudulent.

Figure 34:
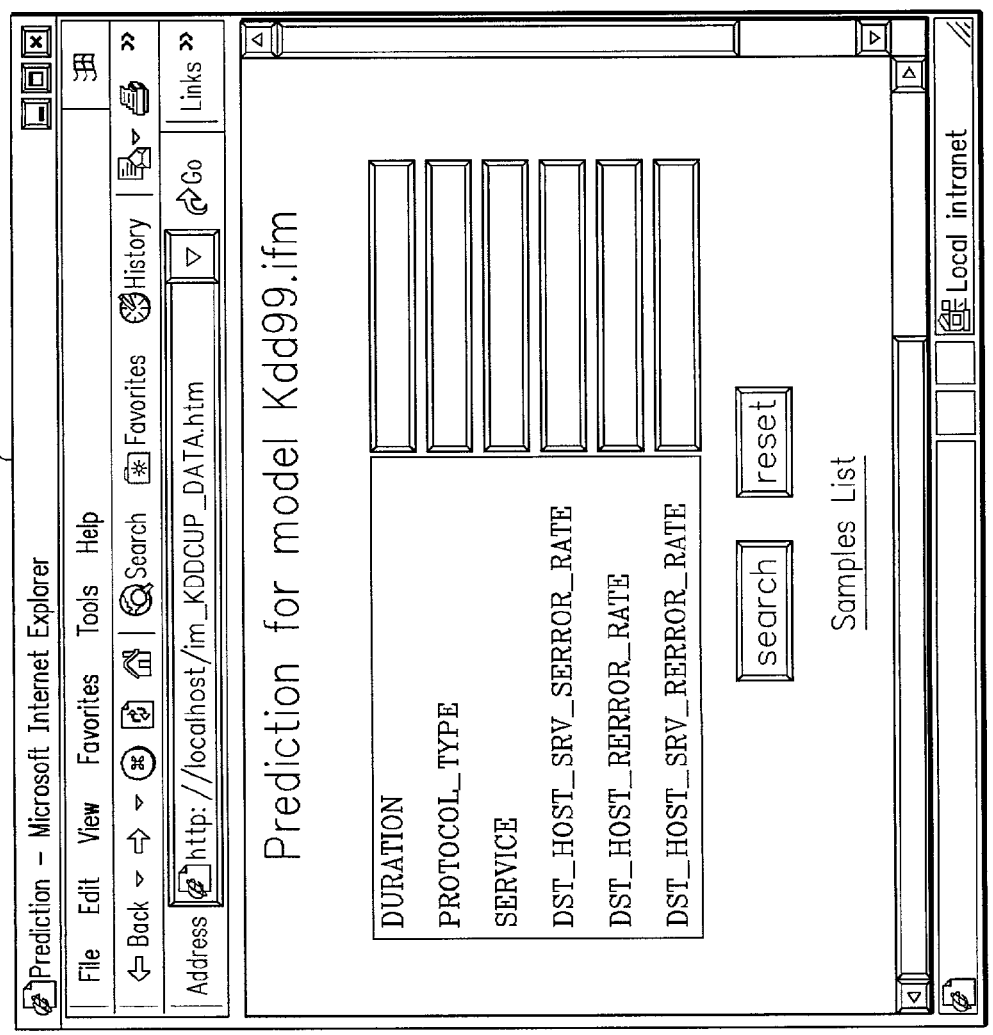
FIG. 34 is an illustrative view of a model query web form for testing the model with individual transactions.

Referring now to FIG. 34, an illustrative view of a model query web form for testing the model with individual transactions is described. Model query web form 215 is created by model training interface 51 (FIG. 1) to allow clients running the model to query the model for individual transactions. Query web form 215 is a web page that can be accessed through the clients' web site. Clients enter data belonging to an individual transaction into query web form 215 to evaluate whether the model is identifying the transaction as fraudulent or not. Alternatively, clients may use query web form 215 to test the model with a known transaction to ensure that the model was trained properly and predicts the output of the transaction accurately.

Although particular embodiments of the present invention have been described above in detail, it will be understood that this description is merely for purposes of illustration. Specific features of the invention are shown in some drawings and not in others, and this is for convenience only. Steps of the described systems and methods may be reordered or combined, and other steps may be included. Further variations will be apparent to one skilled in the art in light of this disclosure and are intended to fall within the scope of the appended claims.

What is claimed is:

1. A method for detecting and preventing electronic fraud in electronic transactions between a client and a user, the method comprising:

generating a fraud detection and prevention model software component for using a plurality of intelligent technologies to determine whether information sent by the user to the client associated with a new electronic transaction is fraudulent, wherein the model software component is trained on a database of past electronic transactions provided by the client;

querying the model software component with a current electronic transaction to determine whether information sent by the user to the client associated with the current electronic transaction is fraudulent; and updating the model software component with the current electronic transaction, wherein the fraud detection and prevention model software component comprises a plurality of sub-models, each sub-model implementing an intelligent technology to determine whether the electronic transaction is fraudulent, wherein the plurality of sub-models respectively implement neural network technology, rule-based reasoning technology, data mining technology, and case-based reasoning technology, wherein generating the fraud detection and prevention model software component comprises using a model training interface to select which sub-models are to be included in the fraud detection and prevention model software component, wherein querying the model software component with a current electronic transaction to determine whether information sent by the user to the client associated with the current electronic transaction is fraudulent comprises providing the information as input to a binary file and running the binary file to generate a binary output decision on whether the electronic transaction is fraudulent or not, wherein running the binary file to generate the output decision on whether the electronic transaction is fraudulent comprises running the plurality of sub-models to generate a plurality of sub-model decisions and combining the plurality of sub-model decisions to generate the output decision, and wherein combining the plurality of sub-model decisions to generate the output decision comprises assigning a vote to each sub-model decision and generating the output decision based on the majority of votes determining whether the electronic transaction is fraudulent or not.

2. The method of claim 1, wherein the electronic transactions comprise web-based transactions and transactions conducted over wireless networks with the user of cellular phones.

3. The method of claim 1, wherein the plurality of intelligent technologies further comprise multi-agents, fuzzy logic, constraint programming, and genetic algorithms.

4. The method of claim 1, wherein training the model software component on a database of past electronic transactions provided by the client comprises training the plurality of sub-models and creating the binary file for implementing the plurality of sub-models.

5. The method of claim 1, wherein the database of past electronic transactions comprises a plurality of tables, wherein each table comprises a plurality of data fields and data records associated with a plurality of electronic transactions.

6. A method for detecting and preventing electronic fraud in electronic transactions between a client and a user, the method comprising:
generating a fraud detection and prevention model software component for using a plurality of intelligent technologies to determine whether information sent by the user to the client associated with a new electronic transaction is fraudulent, wherein the model software component is trained on a database of past electronic transactions provided by the client;
querying the model software component with a current electronic transaction to determine whether information sent by the user to the client associated with the current electronic transaction is fraudulent; and
updating the model software component with the current electronic transaction, wherein the fraud detection and prevention model software component comprises a plurality of sub-models, each sub-model implementing an intelligent technology to determine whether the electronic transaction is fraudulent, wherein the plurality of sub-models respectively implement neural network technology, rule-based reasoning technology, data mining technology, and case-based reasoning technology, wherein generating the fraud detection and prevention model software component comprises using a model training interface to select which sub-models are to be included in the fraud detection and prevention model software component, wherein querying the model software component with a current electronic transaction to determine whether information sent by the user to the client associated with the current electronic transaction is fraudulent comprises providing the information as input to a binary file and running the binary file to generate a binary output decision on whether the electronic transaction is fraudulent or not, wherein running the binary file to generate the output decision on whether the electronic transaction is fraudulent comprises running the plurality of sub-models to generate a plurality of sub-model decisions and combining the plurality of sub-model decisions to generate the output decision, and wherein combining the plurality of sub-model decisions to generate the output decision comprises assigning a weighted vote to each one of the sub-models, wherein the weighted vote is assigned to prioritize the sub-model decisions, and generating the output decision based on the highest number of votes determining whether the electronic transaction is fraudulent or not.

7. The method of claim 1, wherein combining the plurality of sub-model decisions to generate the output decision comprises providing a plurality of meta-rules to determine how the sub-model decisions are combined to generate the output decision.

8. The method of claim 1, wherein updating the model software component with the current electronic transaction comprises updating the binary file without retraining the model.

9. The method of claim 8, wherein updating the model software component with the current electronic transaction further comprises updating the database with the current electronic transaction and retraining the model to generate a new binary file.

* * * * *